United States Patent
Kaeser et al.

(10) Patent No.: US 10,275,442 B2
(45) Date of Patent: *Apr. 30, 2019

(54) TECHNIQUES FOR AUTOMATIC GENERATION OF NATURAL LANGUAGE TEXT

(71) Applicant: YSEOP SA, Lyons (FR)

(72) Inventors: Alain Kaeser, Paris (FR); Emmanuel Vignon, Dallas, TX (US); Ludan Stoeckle, Miribel (FR)

(73) Assignee: YSEOP SA, Lyons (FR)

(*) Notice: Subject to any disclaimer, the term of this patent is extended or adjusted under 35 U.S.C. 154(b) by 0 days.

This patent is subject to a terminal disclaimer.

(21) Appl. No.: 16/011,832

(22) Filed: Jun. 19, 2018

(65) Prior Publication Data

US 2018/0300306 A1 Oct. 18, 2018

Related U.S. Application Data

(63) Continuation of application No. 13/943,930, filed on Jul. 17, 2013, now Pat. No. 10,037,317.

(51) Int. Cl.
*G06F 17/28* (2006.01)
*G06F 17/24* (2006.01)

(52) U.S. Cl.
CPC ........ *G06F 17/248* (2013.01); *G06F 17/2881* (2013.01)

(58) Field of Classification Search
None
See application file for complete search history.

(56) References Cited

U.S. PATENT DOCUMENTS

| | | | |
|---|---|---|---|
| 4,773,039 A | 9/1988 | Zamora | |
| 5,347,579 A | 9/1994 | Blandford | |
| 6,023,669 A | 2/2000 | Suda et al. | |
| 6,473,892 B1 | 10/2002 | Porter | |
| 7,873,509 B1* | 1/2011 | Budzinski | G06F 17/27 704/9 |
| 7,912,705 B2 | 3/2011 | Wasson et al. | |
| 8,117,206 B2 | 2/2012 | Sibley et al. | |
| 8,150,676 B1* | 4/2012 | Kaeser | G06F 17/2881 704/1 |
| 8,161,063 B2 | 4/2012 | Balduccini | |

(Continued)

OTHER PUBLICATIONS

Henschel et al., Pronominalization revisited. Proceedings of the 18th conference on Computational linguistics. 2000;1:306-12.

(Continued)

*Primary Examiner* — Michael N Opsasnick
(74) *Attorney, Agent, or Firm* — Wolf, Greenfield & Sacks, P.C.

(57) ABSTRACT

Techniques for creating a template to be used in connection with automatically generating text. Techniques include creating a template to include human language text and at least a first tag that serves as a placeholder for a text portion referring to at least one referent; and allowing a user to specify multiple options to be used in place of the first tag when generating output text using the created template, the options comprising at least a first referential expression for the at least one referent and at least a first anaphoric expression for the at least one referent.

20 Claims, 20 Drawing Sheets

| Anaphora Reference object for theDogs | |
|---|---|
| Extralinguistic Referent | dogs |
| Reference Type | Referential or Anaphora |
| last reference gender | MASCULINE or FEMININE |
| last reference number | SINGULAR or PLURAL |

| theDogs referent | |
|---|---|
| Nature | Dog |
| Anaphora Components Structure for theProduct | see link |

| Anaphora Components Structure for the two little dogs | |
|---|---|
| Referential | "the two little dogs" |
| Anaphora | A personal pronoun (they) |
| Incompatible with | Person |

| Anaphora Reference object for theSmith | |
|---|---|
| Extralinguistic Referent | theSmith |
| Reference Type | Referential or Anaphora |
| last reference gender | MASCULINE or FEMININE |
| last reference number | SINGULAR or PLURAL |

| theSmith referent | |
|---|---|
| Nature | Person |
| Anaphora Components Structure for theProduct | see link |

| Anaphora Components Structure for the smiths | |
|---|---|
| Referential | "Mr. and Mrs. Smith" |
| Anaphora | A personal pronoun (they) |
| Incompatible with | Dog |

(56) References Cited

U.S. PATENT DOCUMENTS

| | | | |
|---|---|---|---|
| 8,417,513 B2 | 4/2013 | Prompt et al. | |
| 8,688,436 B1* | 4/2014 | Budzinski | G06F 17/27 704/9 |
| 8,972,445 B2* | 3/2015 | Gorman | G06F 17/2785 707/771 |
| 9,411,804 B1 | 8/2016 | Kaeser et al. | |
| 10,037,317 B1* | 7/2018 | Kaeser | G06F 17/248 |
| 2003/0101047 A1 | 5/2003 | Panttaja | |
| 2003/0144831 A1 | 7/2003 | Ford | |
| 2003/0182310 A1 | 9/2003 | Charnock et al. | |
| 2004/0107088 A1* | 6/2004 | Budzinski | G06F 17/27 704/10 |
| 2005/0114283 A1 | 5/2005 | Pearson et al. | |
| 2006/0100858 A1 | 5/2006 | McEntee et al. | |
| 2006/0136352 A1 | 6/2006 | Brun et al. | |
| 2006/0173731 A1* | 8/2006 | Scarpelli | G06Q 10/06398 705/7.19 |
| 2006/0253418 A1 | 11/2006 | Charnock et al. | |
| 2007/0011607 A1 | 1/2007 | Lazareck et al. | |
| 2007/0168922 A1 | 7/2007 | Kaiser | |
| 2007/0169021 A1 | 7/2007 | Huynh et al. | |
| 2008/0097744 A1 | 4/2008 | Levy | |
| 2008/0263038 A1 | 10/2008 | Judge et al. | |
| 2008/0319978 A1 | 12/2008 | Brun et al. | |
| 2009/0076799 A1 | 3/2009 | Crouch et al. | |
| 2009/0125534 A1 | 5/2009 | Morton et al. | |
| 2009/0182549 A1 | 7/2009 | Anisimovich et al. | |
| 2009/0217149 A1 | 8/2009 | Kamien et al. | |
| 2011/0184718 A1 | 7/2011 | Chen | |
| 2011/0207439 A1 | 8/2011 | Ross et al. | |
| 2011/0301982 A1 | 12/2011 | Green, Jr. et al. | |
| 2012/0117078 A1 | 5/2012 | Morton et al. | |
| 2014/0129210 A1 | 5/2014 | Convertino et al. | |
| 2014/0149107 A1 | 5/2014 | Schilder | |
| 2014/0236569 A1 | 8/2014 | Bufe et al. | |
| 2015/0143413 A1 | 5/2015 | Hall et al. | |
| 2015/0169548 A1 | 6/2015 | Reiter | |
| 2015/0212696 A1 | 7/2015 | Nordstrom | |

OTHER PUBLICATIONS

Krahmer et al., A Meta-Algorithm for the Generation of Referring Expressions. TU/e, Eindhoven University of Technology, The Netherlands, 2001.

McCoy et al., Generating Anaphoric Expressions: Pronoun or Definite Description. Proceedings of the ACL Workshop on the Relation of Discourse/Dialogue structure and Reference. 1999;63-71.

Reiter et al., Building applied natural language generation systems. Natural Language Engineering. 1997;3(1):57-87.

Theune et al., The automatic generation of narratives. Proceedings of the 17th Meeting of Computational Linguistics in the Netherlands. CLIN 17. 2007:131-46.

Van Deemter et al., Real versus Template-Based Natural Language Generation: A False Opposition? Comput. Linguist. 2005;31(1):15-24.

* cited by examiner

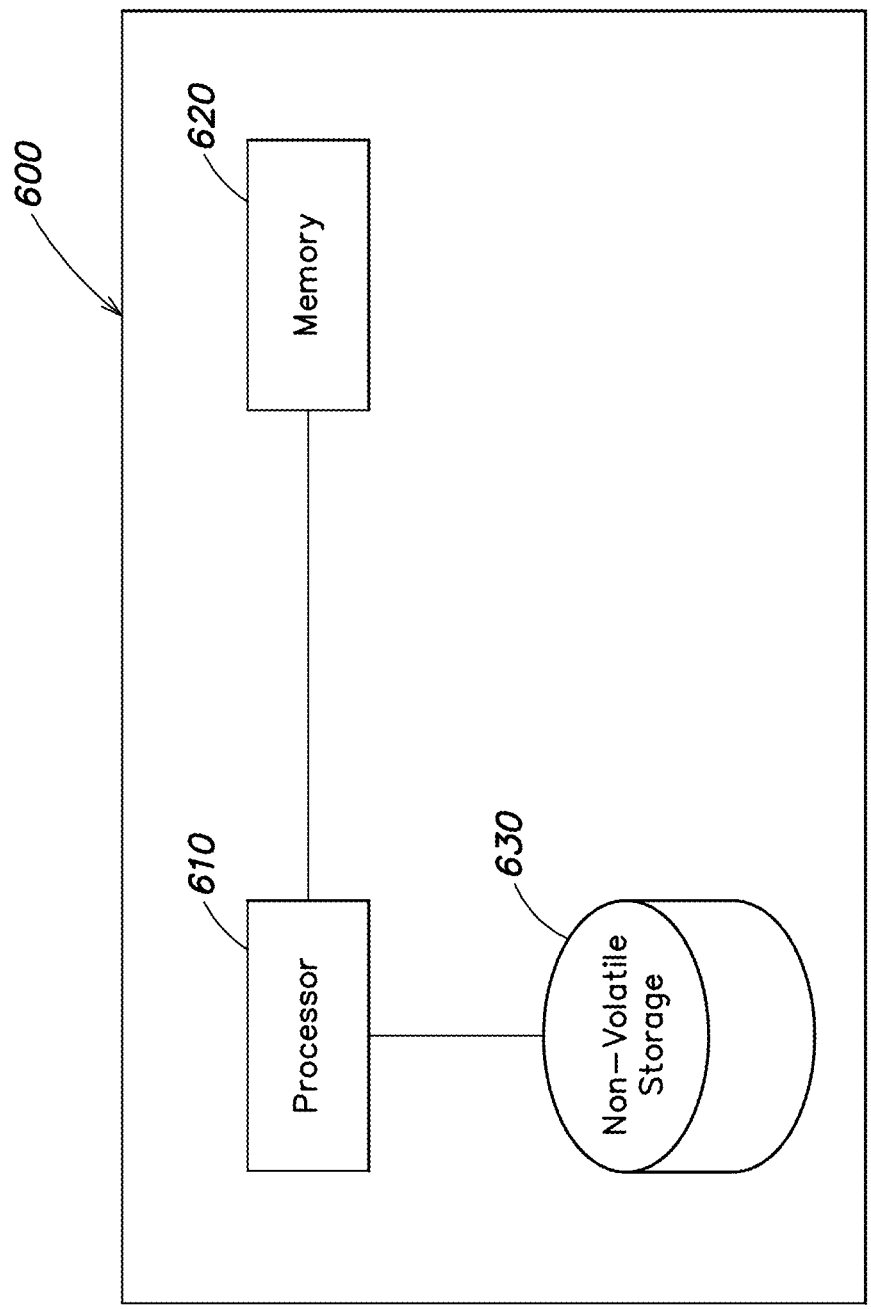

| maryReferent (of nature Person) | |
|---|---|
| First Name | "Mary" |
| Last Name | "Smith" |
| Civility | Female |
| Anaphora Components Structure for theProduct | see link |

| jenniferReferent (of nature Person) | |
|---|---|
| First Name | "Jennifer" |
| Last Name | "Doe" |
| Civility | Female |
| Anaphora Components Structure for theProduct | see link |

| Anaphora Components Structure for a Perso | |
|---|---|
| Referential | the person's first name (clients first name's gender and number) |
| Anaphora | A personal pronoun<br>if last reference gender is Masculine, then "he" or "him"<br>if last reference gender is Feminine, then "she" or "her" |

FIG. 12

| Anaphora Components Structure for one or several elements of the Person nature | |
|---|---|
| Referential if single | the person's civility + the person's last name |
| Anaphora if single | A personal pronoun<br>if last reference gender is Masculine, then "he"<br>if last reference gender is Feminine, then "she" |
| Referential if collection | the persons' civilities, separated by comas (between the second last and the last, separate with "and")<br>* the person's last name |
| Anaphora if collection | A personal pronoun<br>if last reference gender is Masculine, then "he"<br>if last reference gender is Feminine, then "she"<br>if the collection contains more than one items, then "they" |

| Anaphora Reference object for boatReferent | |
|---|---|
| Extralinguistic Referent | boatReferent |
| Reference Type | Referential or Anaphora |
| last reference gender | MASCULINE or FEMININE |
| last reference number | SINGULAR or PLURAL |

| boatReferent | |
|---|---|
| Anaphora Components Structure | see link |

| Anaphora Components Structure for a Boat nature | | |
|---|---|---|
| Referential | if there is an owner linked to this element than "boat" if there is no owner linked to this reference, then "the" boat | |
| Anaphora | it | |

| Anaphora Reference object for johnReferent | |
|---|---|
| Extralinguistic Referent | johnReferent |
| Reference Type | Referential or Anaphora |
| last reference gender | MASCULINE or FEMININE |
| last reference number | SINGULAR or PLURAL |

| johnReferent | |
|---|---|
| First Name | "John" |
| Last Name | "Smith" |
| Civility | Male |
| Anaphora Components Structure | see link |

| Anaphora Components Structure for a Person nature | | |
|---|---|---|
| Referential | the person's civility + the person's last name | |
| Anaphora | The person's first name or A personal pronoun if last reference gender is Masculine, then "he" if last reference gender is Feminine, then "she" | |

FIG. 15

| Anaphora Reference object for oldWomanReferent | |
|---|---|
| Extralinguistic Referent | oldWomanReferent |
| Reference Type | Referential or Anaphora |
| last reference gender | MASCULINE or FEMININE |
| last reference number | SUNGULAR or PLURAL |
| local information | |

| oldWomanReferent | | |
|---|---|---|
| Civility | Male | woman |
| Denomination | | |
| Anaphora Components Structure for theProduct | see link | |

| Anaphora Reference object for oldManReferent | |
|---|---|
| Extralinguistic Referent | oldManReferent |
| Reference Type | Referential or Anaphora |
| last reference gender | MASCULINE or FEMININE |
| last reference number | SUNGULAR or PLURAL |
| local information | |

| oldManReferent | | |
|---|---|---|
| Civility | Male | man |
| Denomination | | |
| Anaphora Components Structure for theProduct | see link | |

| | Anaphora Components Structure for theProduct |
|---|---|
| Referential | "the old" + denomination<br><br>X = the last referent of nature Person that is different from the current one.<br><br>1. If the X's local information is personalPronoun, the following occurrence is possible<br>— if last reference gender is Masculine, then "he"<br>— if last reference gender is Feminine, then "she"<br>— add in the current referent local information: personalPronoun |
| Anaphora | 2. if the X's local information is theManWoman, the following occurrence is possible<br>— if last reference gender is Masculine, then "the man"<br>— if last reference gender is Feminine, then "the woman"<br>— add in the current referent local information theManWoman<br><br>if the reference's local information of X is empty, then the two choices above are possible |

*FIG. 16B*

TECHNIQUES FOR AUTOMATIC GENERATION OF NATURAL LANGUAGE TEXT

CROSS-REFERENCE TO RELATED APPLICATION

This application claims the benefit under 35 U.S.C. § 120 and is a continuation of U.S. patent application Ser. No. 13/943,930 entitled "TECHNIQUES FOR AUTOMATIC GENERATION OF NATURAL LANGUAGE TEXT," filed Jul. 17, 2013, which is incorporated herein by reference in its entirety.

FIELD OF INVENTION

The techniques described herein relate to the field of automatic generation of natural language text, and more particularly to techniques for generation of referring expressions.

BACKGROUND

Natural language generation (NLG) is the automatic generation of human-language text (i.e., text in a human language) based on information in non-linguistic form. For example, natural language generation techniques may be used to automatically create a textual description of a day of trading of a particular stock based on data indicating the change in stock price throughout the day, to automatically generate a confirmation e-mail for an online purchase made via the Internet from data describing the purchase, to generate real-time comments about a sporting event using data about the game, or for numerous other applications.

Natural language generation may be performed by using template-based techniques. In NLG systems that employ template-based techniques, a template processor may be programmed to replace placeholders (e.g., tags, special symbols, etc.) in pre-defined templates with language to include in the generated text. The language used to replace the placeholders in the template is identified based on user input, NLG system parameters, and/or in any other suitable manner.

SUMMARY

Some embodiments provide for a method for use in connection with a system for automatically generating text. The method comprises accessing information specifying at least one referential expression for at least a first referent and at least one anaphoric expression for at least the first referent; accessing a template that includes human-language text and a first tag that serves as a placeholder for a first text portion including a reference to at least the first referent; automatically identifying, using at least one system rule and at least one processor, text to use for the first text portion at least in part by determining whether to use as the text for the first text portion the at least one referential expression or the at least one anaphoric expression; and automatically generating output text including the human-language text and the identified text for the first text portion.

Other embodiments provide for a system comprising at least one processor configured to perform accessing information specifying at least one referential expression for at least a first referent and at least one anaphoric expression for at least the first referent; accessing a template that includes human-language text and a first tag that serves as a placeholder for a first text portion including a reference to at least the first referent; automatically identifying, using at least one system rule, text to use for the first text portion at least in part by determining whether to use as the text for the first text portion the at least one referential expression or the at least one anaphoric expression; and automatically generating output text including the human-language text and the identified text for the first text portion.

Still other embodiments provide for at least one non-transitory computer readable storage medium storing processor executable-instructions that, when executed by at least one processor, cause the at least one processor to perform: accessing information specifying at least one referential expression for at least a first referent and at least one anaphoric expression for at least the first referent; accessing a template that includes human-language text and a first tag that serves as a placeholder for a first text portion including a reference to at least the first referent; automatically identifying, using at least one system rule, text to use for the first text portion at least in part by determining whether to use as the text for the first text portion the at least one referential expression or the at least one anaphoric expression; and automatically generating output text.

Still other embodiments provide for a method for generating a template to be used in connection with automatic text generation, the method comprising: creating, at least in part by using at least one processor, the template to include human language text and at least a first tag that serves as a placeholder for a text portion referring to at least one referent; and allowing a user to specify multiple options to be used in place of the first tag when generating output text using the created template, the options comprising at least a first referential expression for the at least one referent and at least a first anaphoric expression for the at least one referent.

Still other embodiments provide for a system comprising at least one processor configured to perform creating the template to include human language text and at least a first tag that serves as a placeholder for a text portion referring to at least one referent; and allowing a user to specify multiple options to be used in place of the first tag when generating output text using the created template, the options comprising at least a first referential expression for the at least one referent and at least a first anaphoric expression for the at least one referent.

Still other embodiments provide for at least one non-transitory computer-readable storage medium storing processor-executable instructions that, when executed by at least one processor, cause the at least one processor to perform: creating the template to include human language text and at least a first tag that serves as a placeholder for a text portion referring to at least one referent; and allowing a user to specify multiple options to be used in place of the first tag when generating output text using the created template, the options comprising at least a first referential expression for the at least one referent and at least a first anaphoric expression for the at least one referent.

The foregoing is a non-limiting summary of the invention, which is defined by the attached claims.

BRIEF DESCRIPTION OF DRAWINGS

Various aspects and embodiments of the disclosure provided herein are described below with reference to the following figures. It should be appreciated that the figures are not necessarily drawn to scale. Items appearing in multiple figures are indicated by the same or a similar reference number in all the figures in which they appear.

FIG. 6 is a block diagram of an illustrative computer system that may be used in implementing some embodiments.

FIGS. 7-10, 12, 13, 14A, 14B, 15, 16A and 16B are diagrams illustrating data structures for storing information about one or more referents and/or one or more options for language to use when referring to each of the multiple referents, in accordance with some embodiments.

DETAILED DESCRIPTION

Figure 1A:
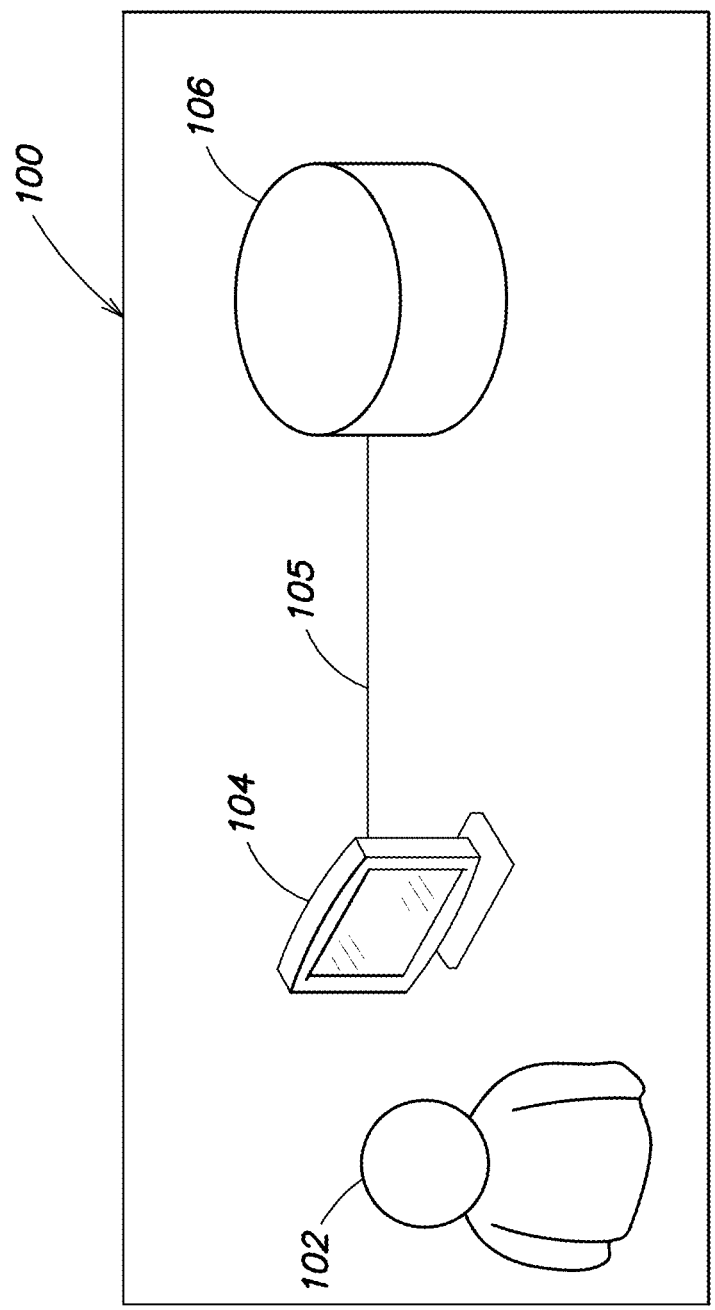
FIG. 1A illustrates a system for creating a template to be used in automatically generating natural language text, in accordance with some embodiments.

A referent is anything that may be referred to by using natural language. A referent may be any person or persons, any living thing or living things, any object or objects, any place or places, any suitable combination thereof, etc. Natural language text may contain one or multiple referring expressions, called references, each referring to one or multiple referents. Each reference may comprise one word or multiple words. For example, the text "Mary is wearing a suit because she is going to her office" contains two references, "Mary" and "she," to a referent that is a person named Mary. The text also contains a reference "suit" to a referent that is an article of clothing and a reference "office" to a referent that is a place.

A reference to a referent may be any suitable type of expression. One type of reference to a referent is a referential expression. A referential expression in a text may specify the referent to which it is referring without any word(s) not in the referential expression (e.g., other words in the text). For example, the text "Be quiet, Mary is working" contains a referential expression "Mary" referring to a person named Mary. The referential expression "Mary" specifies the referent (a person named Mary) without using any of the other words in the text. As another example, the phrase "the video camera is broken" contains a referential expression "the video camera" referring to electronic equipment. A noun is a non-limiting example of a referential expression. A referential expression may refer to the referent in a way that allows the reader of the text to understand what or who is being referred to by the referential expression.

Another type of reference to a referent is an anaphoric expression. An anaphoric expression in a text specifies the referent to which it is referring based at least in part on one or more other references to the same referent in the text. The other reference(s) to the referent may precede the anaphoric expression in the text. For example, the word "she" in the text "Mary is wearing a suit because she is going to her office" is an anaphoric expression because "she" specifies the referent (a person named Mary) based on another reference to the person named Mary (i.e., the referential expression "Mary") occurring earlier in the text. A pronoun is one non-limiting example of an anaphoric expression. The expression "this client" in the text: "Mary bought a computer at our store last year. This client is very important to us," is another example of an anaphoric expression.

Multiple options may exist for language to use for referring to a referent. For example, a template for a car advertisement may include the sentence shown in Table 1 below, where insert(theCar) is a tag serving as a placeholder for a reference to a Toyota® minivan (the referent).

TABLE 1

You should buy insert(theCar). insert(theCar) is a high quality product. insert(theCar) is not very expensive.

There may be multiple language options, including one or more referential expressions and/or one or more anaphoric expressions (e.g., "the car," "the vehicle," "the minivan," "it," etc.), which may be used to replace the placeholder tags in the template of Table 1 to generate the advertisement. The generated text depends on what language option is chosen to replace each of the placeholder tags. Even in this simple example, many different advertisement texts may be generated depending on the referring expressions chosen to replace the placeholder tags.

Conventional NLG systems require users to specify not only the language options that may be used as references to a referent in the generated text, but also the conditions in which each of these options is to be used. Generated text may contain multiple references and each reference may be chosen from a large number of language options. The Applicants have recognized that requiring users to specify, for each of multiple referents to be referenced in generated text, the precise conditions in which each of multiple language options is to be used as a reference for that referent is time-consuming and burdensome for the users. The Applicants have appreciated that it would be advantageous to provide an NLG system that does not require users to specify rules according to which various expressions for referring to referents are to be used when generating text.

The Applicants have also recognized that conventional NLG systems may generate output text containing ambiguous references. A reference may be ambiguous when it is unclear which of multiple potential referents the reference is referring to. For example, if an NLG system were to always insert a pronoun when referring to a person after the person's name has been used earlier in the text, the NLG system may generate text having ambiguous references. For instance, such an NLG system may generate the text: "Mary went to the cinema yesterday. Jennifer met her at the end of the movie. She was wearing a grey skirt," which has an ambiguous reference "she" because it is unclear whether "she" refers to Mary or to Jennifer. The Applicants have appreciated that it would be advantageous to provide an NLG system that does not generate text having ambiguous references.

Some embodiments described herein address all of the above-described issues that the Applicants have recognized with conventional NLG systems. However, not every embodiment described below addresses every one of these issues, and some embodiments may not address any of them. As such, it should be appreciated that embodiments of the disclosure provided herein are not limited to addressing all or any of the above-discussed issues of conventional NLG systems.

Some embodiments provide for an NLG system that automatically determines, based on one or more system rules, what language (i.e., which word(s)) to use when referring to referents in the generated text. In some embodiments, the NLG system may use template-based techniques to generate text. A template may include human-language text and one or more placeholders (e.g., tags, special symbols, etc.) for one or more references to one or more referents. To identify language to use in place of a particular placeholder to refer to a referent, the NLG system may access information specifying one or more referential expressions for the referent, and information specifying one or more anaphoric expressions for the referent, and may automatically identify, using at least one system rule, whether to use one of the referential expressions or one of the anaphoric expressions as the text to use in the generated text, in lieu of the particular placeholder, to refer to the referent. The NLG system may then use the identified reference and the human-language text in the template to generate output natural language text.

As used herein, a system rule refers to any criterion or criteria that an NLG system may use to identify language to be used when referring to a referent in text generated by the NLG system. An NLG system may be programmed with one or more system rules, each of which may be implemented as software code that is part of or otherwise executable by the NLG system. In some embodiments, an NLG system may be programmed to use one or more system rules to identify which of the multiple language options, specified by a user, to use in lieu of each placeholder in the template when generating text. A user may provide information specifying a template comprising one or more placeholders for referring expressions and information specifying multiple language options to use in lieu of the placeholders, but need not specify conditions/rules regulating which of the language options is used to replace each of the placeholder tags in the template.

In some embodiments, the NLG system may choose one among multiple referential and/or multiple anaphoric expressions to refer to a referent. This may be done in any suitable way and, in some embodiments, may be done based on the gender (e.g., masculine, feminine, neuter) and/or the grammatical number (e.g., singular, plural, etc.) of the referent. In some embodiments, the NLG system may choose one among multiple referential and/or anaphoric expressions to refer to a referent based on the gender and/or grammatical number of another (e.g., a previously-occurring) reference to the referent in the output text.

In some embodiments, the NLG system may determine to use an anaphoric expression in the generated text to refer to a referent at a particular location in the generated text, when the generated text includes (or is determined to include) a referential expression for the referent at another location in the generated text within a threshold distance (e.g., within a threshold number of characters/words/paragraphs, etc.) of the particular location. For example, the NLG system may determine to use an anaphoric expression (e.g., "she") to refer to a person named Mary at a particular location in the generated text, when the generated text includes a referential expression (e.g., "Mary") anywhere within the paragraph including the particular location.

In some embodiments, the NLG system may determine whether using an anaphoric expression to refer to a particular referent would result in the insertion of an ambiguous reference in the generated text. When the NLG system determines that using the anaphoric expression as a reference to the referent would result in the insertion of an ambiguous reference in the generated text, the NLG system may determine that a referential expression or an alternative anaphoric expression is to be used to refer to the referent instead of the anaphoric expression. For example, if the text: "Mary went to the cinema yesterday. Jennifer met her at the end of the movie," has been generated using the template shown in Table 2 below, the NLG system may determine that replacing the placeholder tag insert(Mary) with the anaphoric expression "she" may result in the insertion of an ambiguous reference, as it would not be clear whether Mary or Jennifer is wearing the grey skirt. As such, the NLG system may determine to use the referential expression "Mary" to replace the placeholder tag insert(Mary) so that the introduction of a referential ambiguity may be avoided. Techniques according to which an NLG system may determine whether the insertion of an anaphoric expression may result in the insertion of an ambiguous reference are described below.

TABLE 2 insert(Mary) went to the cinema yesterday. insert(Jennifer) met her at the end of the movie. insert(Mary) was wearing a grey skirt.

In some embodiments, a user of an NLG system may provide one or more referential expressions and one or more anaphoric expressions for the referent. Subsequently, the NLG system may generate output text containing a reference to the referent at least in part by automatically choosing, by using at least one system rule, the reference from among the one or more referential expressions and the one or more anaphoric expressions provided by the user.

In some embodiments, a user of the NLG system may specify information for one or multiple referents (e.g., gender, grammatical number, characteristics, and/or any other suitable information). The NLG system may use at least some of this information to determine what language to use when referring to one or more of those referents in generated text.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the disclosure provided herein are not limited in this respect.

Some embodiments of the present application may operate in the illustrative environment 100 shown in FIG. 1A. In the illustrative environment 100, a user 102 may interact with a computing device 104 to create a template to be used in automatically generating natural language text. User 102 may input information specifying the template. The information provided by user 102 may specify human-language text to be included in the template and one or multiple placeholders (e.g., tags, special symbols, blanks, etc.) for one or multiple references to refer to one or multiple referents. Additionally, the information provided by user 102 may include information to be used in conjunction with the template when generating natural language text. For example, the information provided by user 102 may specify multiple language options to be used in place of the placeholders when generating output text based on the template. The language options may comprise one or more referential expressions and/or one or more anaphoric expressions for each of one or more referents. Additionally, the information provided by user 102 may specify information about one or more referents to be referenced in the generated text.

Computing device 104 may be any electronic device with which user 102 may interact to create a template to be used in automatically generating natural language text. In some embodiments, computing device 104 may be a portable device such as a mobile smart phone, a personal digital assistant (PDA), a laptop computer, a tablet computer, or any other portable device with which user 102 may interact to create a template to be used in automatically generating text. Alternatively, computing device 104 may be a fixed electronic device such as a desktop computer, a server, a rack-mounted computer, or any other suitable fixed electronic device with which user 102 may interact to create a template to be used in automatically generating natural language text.

User 102 may interact with computing device 104 in any suitable way to create a template. In some embodiments, computing device 104 may be programmed to present user 102 with one or more interfaces of any suitable type to allow the user to specify information to be used in creating the template (e.g., human-language text to be included in the template, one or more placeholders for references to referents in the template, etc.). Additionally, computing device 104 may be programmed to present user 102 with one or more interfaces of any suitable type to allow the user to specify information to be used in conjunction with the template when generating natural language text. As described above, such information may include multiple language options (e.g., one or more referential and/or anaphoric expressions) to be used in place of the placeholders for referring expressions when generating output text using the template, information about one or more referents to be referenced in the generated text, and/or any other suitable information.

Computing device 104 may store any information used for generating natural language text in data store 106, which is communicatively coupled to computing device 104 via communication link 105. For example, computing device 104 may store one or more templates to be used for generating language text in data store 106. As another example, computing device 104 may store any information that may be used in conjunction with the template to generate natural language text (e.g., information about one or more referents to be referenced in the generated text, language options for references to be used when referring to the referents in the generated text, etc.). The information stored in data store 106 may be stored in any suitable way and in any suitable format, as aspects of the disclosure provided herein are not limited in this respect. Data store 106 may be implemented in any suitable way, may be part of the computing device 104 or separate from it, and may be connected to computing device 104 in any suitable way, as the aspects of the present invention are not limited in this respect.

In some embodiments, a user (e.g., user 102) may be a customer using software, provided by a software provider, configured to use one or multiple system rules to generate natural language text from templates. The software may include one or more templates created by the software provider. The software may allow the customer to specify one or more templates and/or any information to be used in conjunction with the template (e.g., information about one or more referents, language options to use for referring to the referents, etc.) to generate natural language text.

It should be appreciated that environment 100 is illustrative and that many variations are possible. For example, in the illustrated embodiment, a single user (user 102) provides both information specifying a template and any information to be used in conjunction with the template (e.g., information about one or more referents, language options to use for referring to the referents) to use to generate text. However, in other embodiments, different users may specify different pieces of information to be used when generating text. For example, in some embodiments, one user may specify a template including placeholders for one or more references to one or more referents, but a different user may specify information about these references and/or referents.

In some embodiments, the illustrative environment 100 may be used to generate natural language text based on the information provided by user 102 (and/or one or more other users). Though, in other embodiments, a different system may be used to generate natural language text, as aspects of the disclosure provided herein are not limited in this respect. In such embodiments, the system used to generate natural language text may have access to information provided to system 100 (e.g., by having access to information stored in data store 106).

Figure 1B:
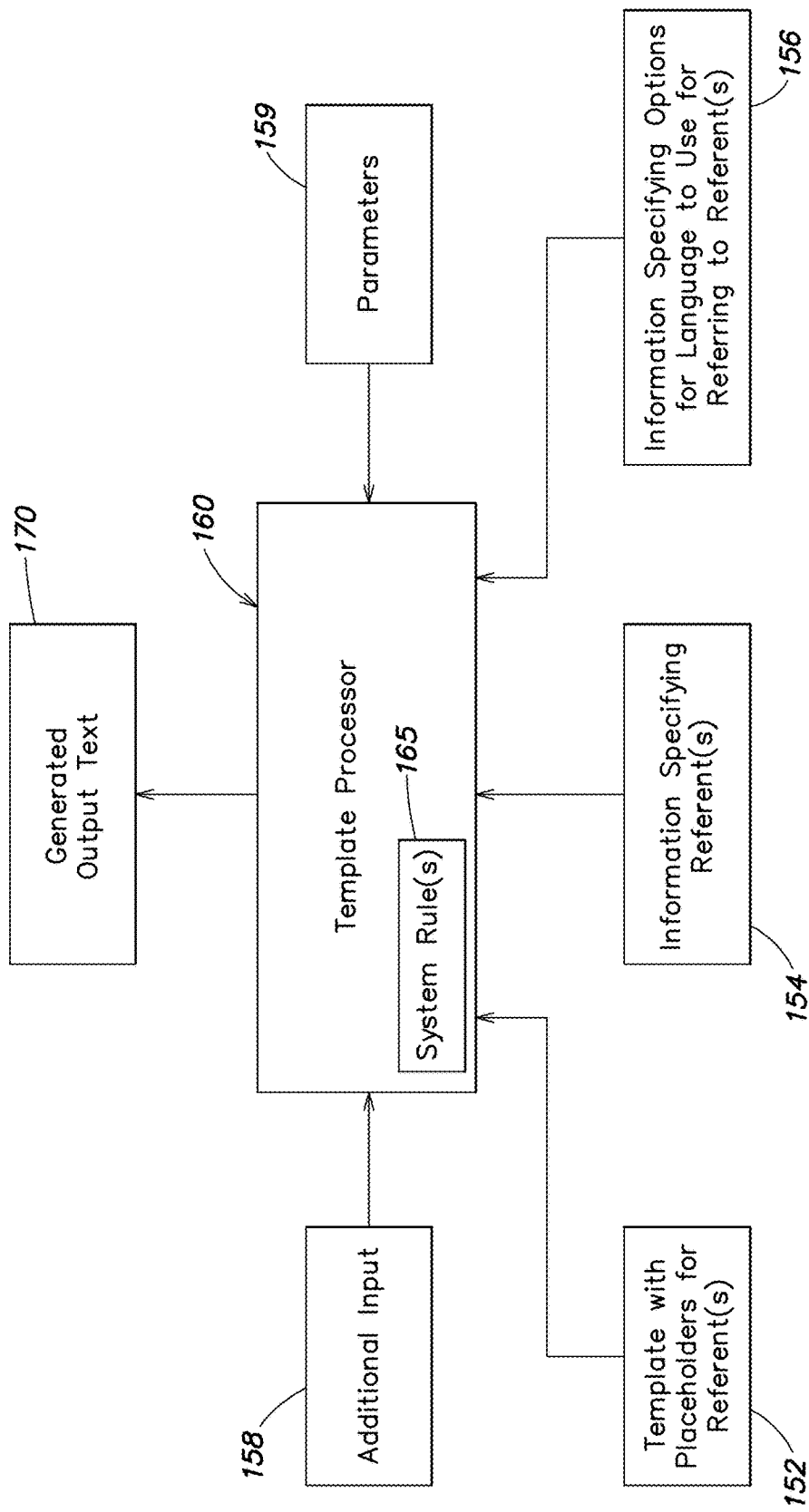
FIG. 1B illustrates a system for automatically generating natural language text using a template, in accordance with some embodiments.

Natural language text may be generated by any suitable natural language generation system. An illustrative NLG system 150 is illustrated in FIG. 1B. In NLG system 150, a template processor 160 accesses inputs including a template 152, information 154 specifying one or more referents, information 156 specifying options for language to use for referring to the referent(s), additional input 158, and parameters 159, and the template processor 160 uses these inputs to automatically generate human-language output text 170. Each of these inputs may be obtained in any suitable way and, in some embodiments, at least some of these inputs may be specified by one or more users (e.g., user 102), as described with reference to FIG. 1A.

Template 152 is a template for generating text. Template 152 may comprise human-language text. The human-language text may relate to any suitable topic or topics. Template 152 may have one or more placeholders (e.g., tags, special symbols, blanks, and/or other indicia) to indicate places in the template that the template processor is to fill in with text. For example, template 152 may comprise one or more placeholders for one or more references to one or more referents. As another example, template 152 may comprise one or more grammatical tags indicating that the text to be generated depends on characteristics of an actor that plays a role in the text to be generated. Examples of grammatical tags are described in U.S. Pat. No. 8,150,676, which is hereby incorporated by reference in its entirety. As another example, template 152 may comprise one or more formatting tags for controlling the formatting of generated text. Examples of formatting tags are also described in U.S. Pat. No. 8,150,676. Template 152 is not limited to include only the above-described items and, in some embodiments, may include suitable text and/or placeholders for text, as aspects of the disclosure provided herein are not limited in this respect.

Information 154 comprises information related to each of one or more referents. Information 154 may specify linguistic characteristics for each of one or more referents. For example, information 154 may specify the gender for each of one or more referents (e.g., "Mary Smith" is a feminine referent, "John Smith" is masculine referent, an object is neuter referent, etc.). As another example information 154 may specify the grammatical number for each of one or more referents (e.g., "car" is singular, "earrings" is plural, etc.). Additionally or alternatively, information 154 may specify non-linguistic characteristics (e.g., a color, a price, weight, dimensions, etc.) for each of one or more referents.

In some embodiments, information 154 may identify one or more groups of referents as being of the same type or nature. For example, information 154 may identify referents that are persons (e.g., "John Smith," "Mary Smith," etc.) as being of the same type. As another example, information 154 may identify referents that are inanimate objects as being of the same type (e.g., chair, desk, computer, etc.). As another example, information 154 may identify any group of referents as being of the same type based on input from one or more users (e.g., user 102) specifying a group of referents of the same type. As described in more detail below, template processor 160 may identify language to use for referring to a referent based on the type of the referent and the type of one or more other referents being referred to in the generated text. In particular, as described below, insertion of anaphoric expressions to refer to referents of the same type may introduce ambiguous references in the generated text. Information 154 may specify any other suitable information for each of one or more referents, as aspects of the disclosure provided herein are not limited by the type of information that may be specified for referents.

Information 156 specifies options for language to use when referring to each of one or more referents. Accordingly, information 156 may comprise one or more referential expressions, one or more anaphoric expressions, and/or any other suitable type of expressions for referring to each of one or more referents in the generated text.

Additional input 158 includes other information that template processor 160 may use in generating and/or identifying text to replace the placeholders in the template. For example, if template 152 is a template for an e-mail confirmation of an on-line purchase, additional user input may include information that describes the online purchase (e.g., the date of the purchase, the item(s) purchased, the amount of the purchase, etc.) that is used to generate and/or determine the text to be used in lieu of the placeholders of template 152. Parameters 159 include any parameters used by template processor 160 to perform generation of text.

The template processor 160 may be programmed to generate human-language output text using one or more system rules 165 and may do so in any suitable way using any suitable techniques. In some embodiments, the template processor may use one or more system rules 165 to identify language to use for referring to referents in template 152. This is described in more detail below with reference to FIG. 4. Template processor 160 may be programmed to generate natural language text in any suitable language (English, French, Spanish, Mandarin, etc.), as aspects of the disclosure provided herein are not limited to generating text in any particular language. Template processor 160 may be implemented as hardware, software, or any suitable combination thereof.

Figure 2:
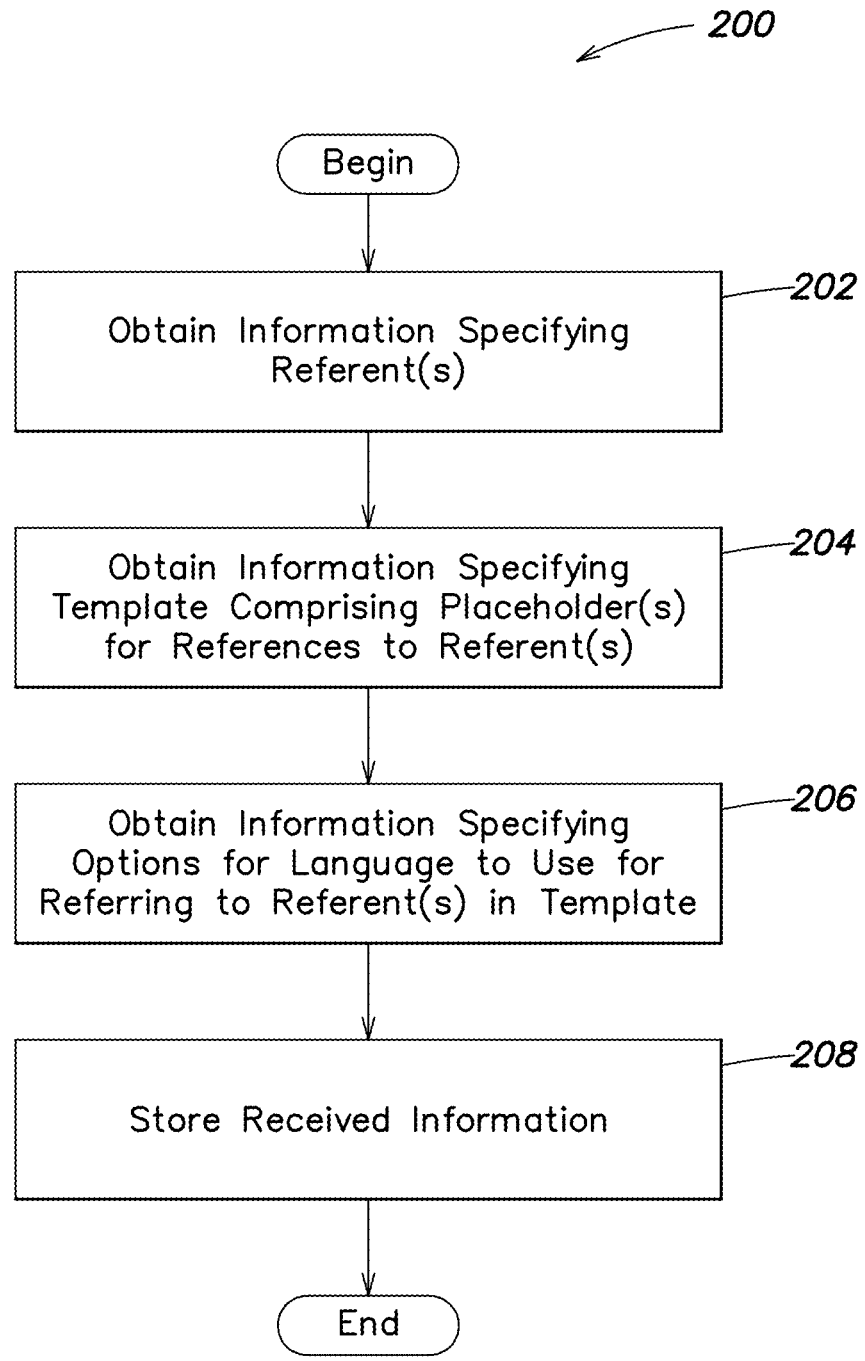
FIG. 2 is a flow chart of an illustrative process for creating a template to be used in automatically generating natural language text, in accordance with some embodiments.

As described above, inputs used by template processor 160 to generate text may be provided by a user (e.g., user 102). FIG. 2 is a flow chart of an illustrative process 200 for obtaining at least some of these inputs from the user. Process 200 may be performed by any suitable system (e.g., illustrative environment 100 described above).

Process 200 begins at act 202, where information specifying one or more referents is obtained. Next, at act 204, information specifying a template comprising one or more placeholders for one or more references to one or more referents is obtained. The template may comprise any suitable type of information, examples of which have been provided. Next, at act 206, information specifying options for language to use to refer to one or more referents is obtained. Examples of each of these types of information have been provided. Information obtained in any of acts 202-206 may be obtained from a user (e.g., user 102), directly or indirectly, in any suitable way.

Figure 3A:
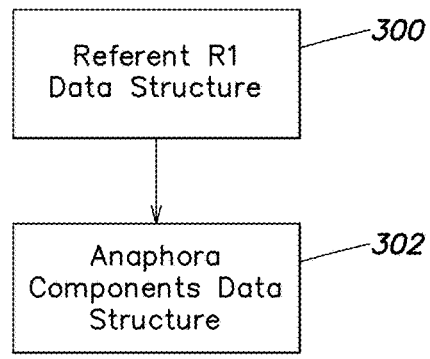
FIGS. 3A-3B illustrate data structures for storing information about a referent and one or more options for language to use when referring to the referent, in accordance with some embodiments.

Next, at act 208, the information received at acts 202-206 is stored by the system performing process 200, after which process 200 completes. In some embodiments, the information obtained at acts 202-206 may be stored using one or more data structures. For example, information about each referent may be stored in a corresponding data structure, e.g., a "referent data structure." In this way, information specifying multiple referents obtained at act 202 may be stored using multiple referent data structures. A referent data structure for a particular referent may be associated with (e.g., by storing a link/pointer to) another data structure, e.g., an "anaphora components data structure," which stores options for language to use when referring to the referent in generated text. This is illustrated in FIG. 3A, which shows a referent data structure 300 storing information specifying referent $R_1$ and linked to an anaphora components structure data 302 storing information specifying language options to use when referring to referent $R_1$ The referent and anaphora components data structures may store data in any suitable way and in any suitable format, as aspects of the disclosure provided herein are not limited in this respect.

Figure 3B:
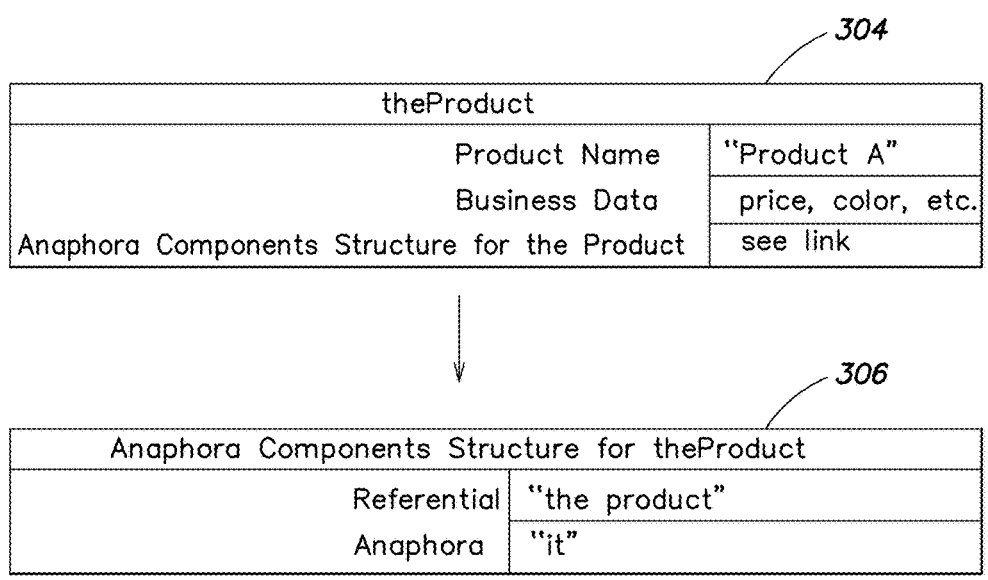

FIG. 3B illustrates the referent and anaphora components data structures for another referent ("theProduct"). Referent data structure 304 stores the referent's name (e.g., "Product A") and information about non-linguistic characteristics of Product A (e.g., price, color, etc.). Referent data structure 304 is associated with anaphora components structure 306 storing information language options to use when referring to "Product A." In the illustrative example, anaphora component data structure 306 stores one referential expression "the product" and one anaphoric expression "it," though an anaphora component structure may store any suitable number of referential and/or anaphoric expressions.

Figure 3C:
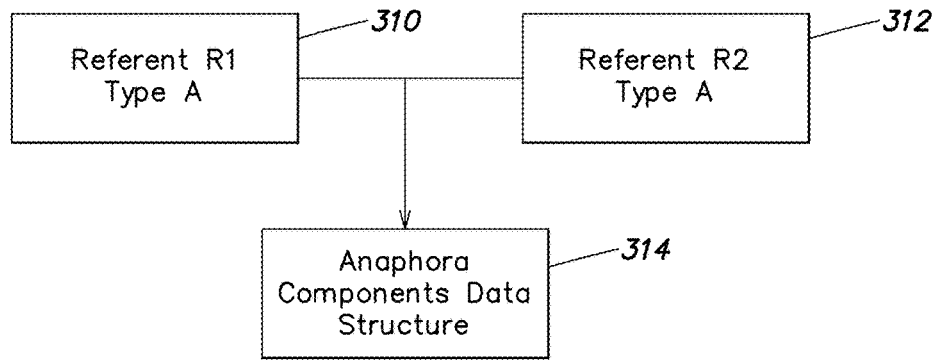
FIGS. 3C-3D illustrate data structures for storing information about multiple referents and one or more options for language to use when referring to each of the multiple referents, in accordance with some embodiments.

In some embodiments, an anaphora components data structure specifies language options to use when referring to a single referent and, as such, is associated with a single referent data structure. For example, as shown in FIG. 3B, anaphora components data structure 306 specifies language options to use when referring only to referent "Product A" and is associated with a single referent data structure 304. In some embodiments, however, an anaphora components data structure may specify language options to use when referring to any one of multiple referents (e.g., referents of the same type), as illustrated in FIG. 3C. In this way, an anaphora components data structure need not be created for each referent (of potentially many referents) referred to in a template.

Figure 3D:
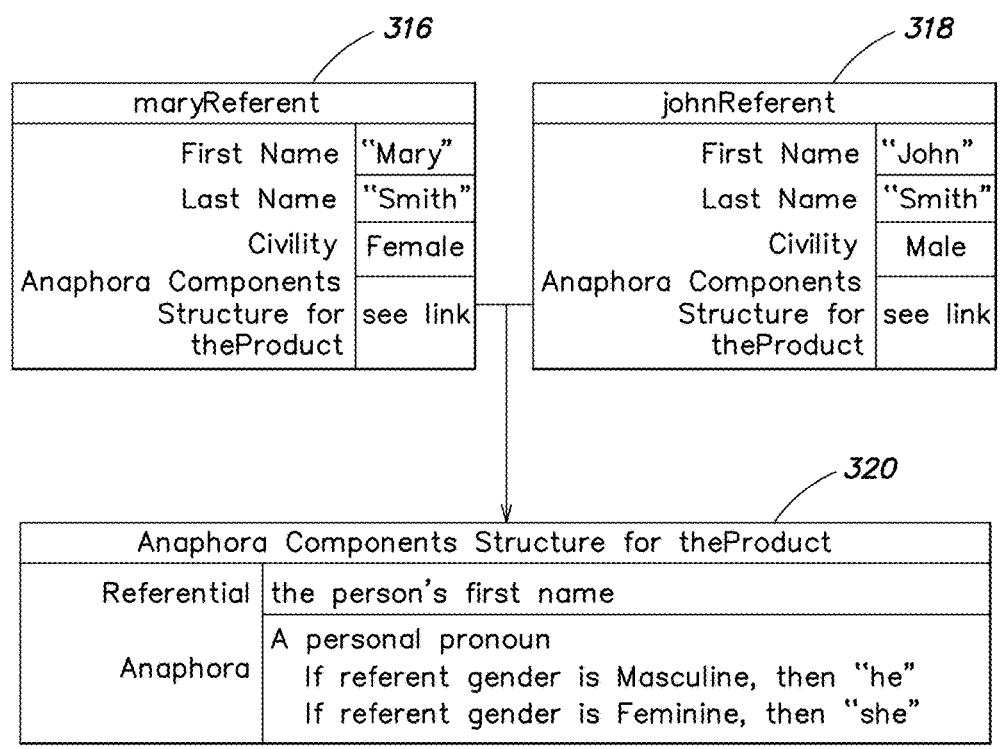

Accordingly, in some embodiments, language options to use for referring to a referent may be specified in dependence on one or more (linguistic and/or non-linguistic) characteristics of the referent, and at least some of the information specifying these language options may be stored using a "dynamic" anaphora components data structure. FIG. 3D illustrates one such "dynamic" anaphora components data structure 320, which specifies referential and anaphoric expressions for each of multiple referents in dependence on characteristics of each referent. In FIG. 3D, dynamic anaphora components data structure 320 is associated with two referents (maryReferent 316 and johnReferent 318). The data structure 320 specifies that a referential expression for a particular referent is the first name specified for the referent (e.g., Mary for referent 316 and John for referent 318) and that an anaphoric expression for a particular referent depends on the gender of the referent (e.g., "she" for referent 316 and "he" for referent 318). An NLG system may use anaphora components data structure 320 to generate "John bought a computer. He is so happy," from a template including "insert(johnReferent) bought a computer. insert(johnReferent) is so happy," and to generate "Mary bought a computer. She is so happy," from a template including "insert(maryReferent) bought a computer. insert (maryReferent) is so happy."

Figure 4:
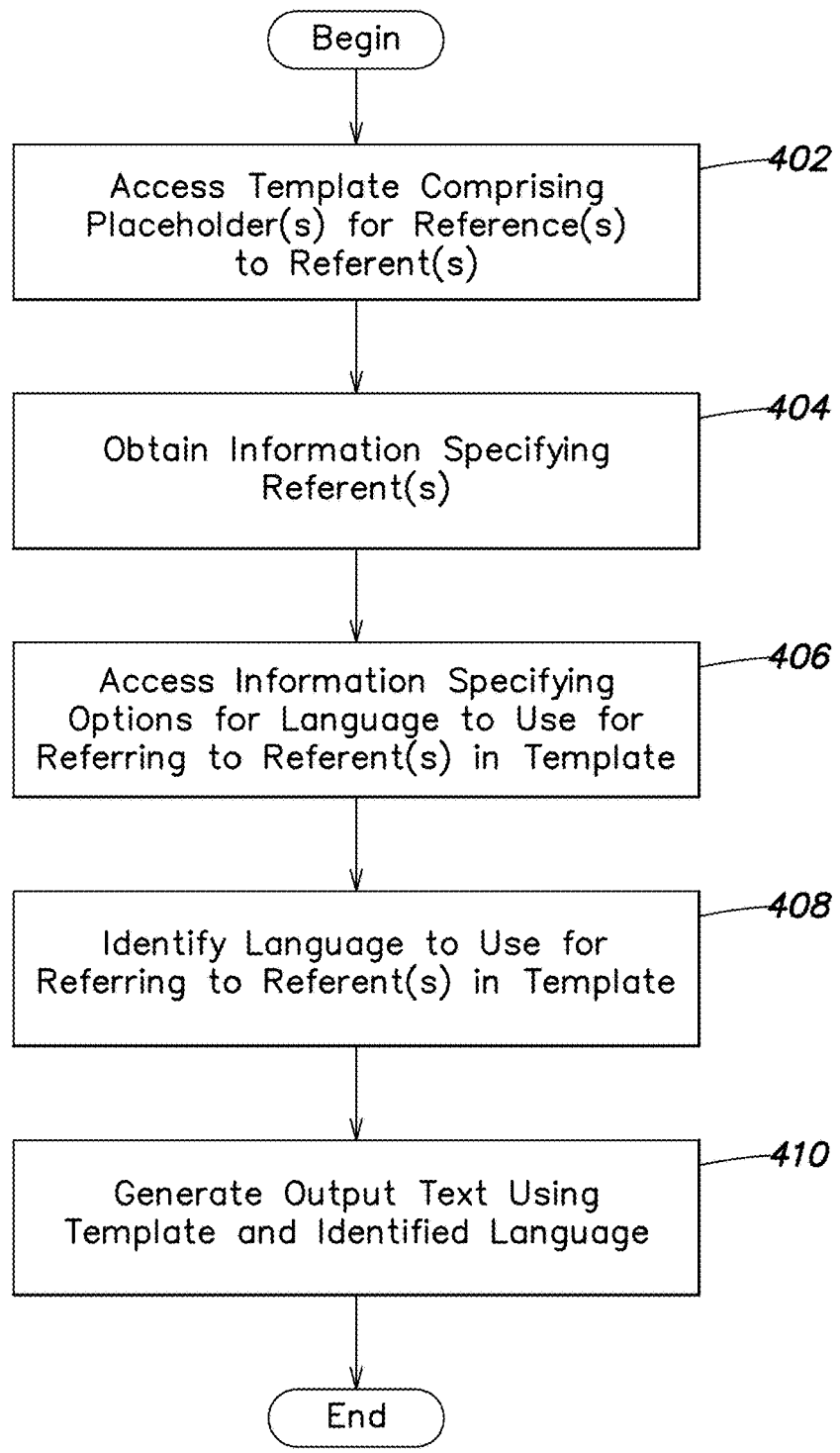
FIG. 4 is a flow chart of an illustrative process for identifying language to use for referring to one or more referents in a template and generating natural language text using the template and the identified language, in accordance with some embodiments.

As previously described, template processor 160 may generate natural language text from inputs in any suitable way using any suitable technique. One example of such a technique is illustrated in FIG. 4 which a flow chart of illustrative process 400 for generating natural language text. Process 400 may be performed using any suitable natural language generation system (e.g., NLG system 150).

Process 400 begins at act 402, where the NLG system accesses a template comprising one or more placeholders for referring expressions to one or more referents. Next process 400 proceeds to act 404, where the NLG system accesses information specifying one or more of the referents to which references are to be inserted in the template. Examples of information specifying one or more referents have been provided. Next process 400 proceeds to act 406, where the NLG system accesses information specifying options for language to use for referring to referent(s) in the template, examples of which have been provided. The NLG system may access information at acts 402, 404, and 406 in any suitable way and from any suitable source, as aspects of the disclosure provided herein are not limited in this respect. In some embodiments, information accessed at act 404 may be stored in one or more referent data structures and information accessed at act 406 may be stored in one or more anaphora components data structures.

Next, process 400 proceeds to act 408, where the NLG system identifies language to use for referring to one or more referents in the template accessed at act 402. Ways in which the NLG system may perform this act are described in more detail below.

After the NLG system identifies language with which to replace each of one or more placeholders in the template, process 400 proceeds to act 410, where the NLG system generates output text using the identified language and the human-language text in the template. This may be done in any suitable way. For example, the NLG system may replace a placeholder for a reference to a referent in the template with language identified at act 408. The NLG system may modify the identified language based on one or more grammatical and/or syntactical rules (e.g., the first character in the identified language may be capitalized when the identified language is inserted at the beginning of a sentence). As another example, the NLG system may generate text using a look-up table, a list, a dictionary, a linguistic model or tree, or in any other suitable way. After the NLG system generates text at act 410, process 400 completes.

It should be appreciated that process 400 is illustrative and that variations of process 400 are possible. For example, in the illustrated embodiment, the NLG system generates text only after it has identified language with which to replace each of the placeholders in the template. However, in other embodiments, the NLG system may generate at least a portion of the text after identifying the language with which to replace some (e.g., at least one), but not all of the placeholders for referring expressions in the template.

Returning to the description of act 408 of process 400, recall that the NLG system may be programmed to identify the language with which to replace a placeholder for a reference to a referent by using on one or more system rules. Various examples of system rules are described below, but it should be recognized that these examples are illustrative and that the NLG system may identify language to use for referring to one or more referents in the template using other system rules and/or in any other suitable way.

In some embodiments, the NLG system may identify language with which to replace the placeholder tags one tag at a time and in the order that the tags appear in the template to generate text from the template. However, this is not a limitation of aspects of the disclosure provided herein, as the NLG system may identify language with which to replace the placeholder tags one or multiple tags at a time in any suitable order.

In some embodiments, the NLG system may automatically identify, using at least one system rule, language to use for referring to a referent by determining whether to use a referential expression or an anaphoric expression to refer to that referent. In accordance with some system rules, the NLG system may determine to use an anaphoric expression to refer to the referent, when the NLG system has already generated (or made a determination that it would generate) text comprising a referential expression to the same referent and, otherwise, to use a referential expression to refer to the referent.

As an illustrative example, the NLG system may process the template shown in Table 3 below, which includes human-language text as well as three tags serving as placeholders for references to the referent theProduct. The corresponding

TABLE 3

... insert(theProduct) is awesome. insert(theProduct) matches your need. insert(theProduct) is cheap. ...

referent and anaphora component structures are shown in FIG. 3B. When identifying language with which to replace the first occurrence of the tag insert(theProduct), the NLG system may determine whether it has generated (or determined to generate) text containing a reference to the referent theProduct when processing any portion of the template preceding the tag. In this example, the NLG system determines that it has not generated (or determined to generate) text containing a reference to the referent theProduct. As a result, the system determines to replace the first tag with a referential expression (e.g., "the product") rather than an anaphoric expression (e.g., "it"). However, when identifying language with which to replace the second and third occurrences of the insert(theProduct) tag, the NLG system may determine to use the anaphoric expression "it", as the NLG system has already generated (or determined to generate) the referential expression "the product" to replace the first occurrence of that tag in the template. Thus, the NLG system may process the illustrative template shown in Table 3 to generate the text: "The product is awesome. It matches your need. It is cheap."

The NLG system may determine whether it has generated (or determined to generate) text containing a reference to a particular referent in any suitable way. In some embodiments, the NLG system may store information about each generated (or determined to be generated) reference to a referent and access this information to determine whether or not the referent has been referenced (e.g., when determining whether to use a referential or an anaphoric expression to refer to the referent, as described above). The NLG system may store information about each generated (or determined to be generated) reference using a data structure (which may be called an "anaphora reference data structure") or in any other suitable way.

Information about each generated (or determined to be generated) reference may include any suitable information including, but not limited to, the type of the reference (e.g., referential or anaphoric), information identifying the referent to which the reference refers, grammatical number of the reference (e.g., singular, plural, etc.), and the gender of the reference (e.g., masculine, feminine, etc.). For example, when processing the portion of a template shown in FIG. 3, the NLG system may generate the text: "The product is awesome," and store information about the reference "The product" indicating that this is a reference to the referent theProduct and that this reference is a referential expression. As another example, after the NLG system has generated the text: "The product is awesome. It matches your need," the NLG system may store information about the reference "It" indicating that this is a reference to the referent theProduct and that this reference is an anaphoric expression.

In some embodiments, the NLG system may determine to use an anaphoric expression to refer to a referent at a particular location in the generated text, when the NLG system has already generated (or made a determination that it would generate) a referential expression to the same referent within a specified distance of the particular location and, otherwise, to use a referential expression to refer to the referent. For example, the NLG system may determine to use an anaphoric expression at a location in a paragraph to refer to a referent, when the NLG system has generated (or made a determination that it would generate) a referential expression referring to the same referent at a preceding location in the same paragraph. As another example, the NLG system may determine to replace a first tag in a template with an anaphoric expression for a referent when the NLG system has determined to replace a second tag with a referential expression for the referent and the second tag precedes and is within a threshold distance of the first tag in the template (e.g., within a threshold number of characters, words, sentences, paragraphs, etc.).

As previously described, language options to use for referring to a referent may be specified in dependence on one or more (linguistic and/or non-linguistic) characteristics of the referent. Accordingly, in some embodiments, the NLG system may identify language to use for referring to a referent based at least in part on the characteristics of the referent. For example, the NLG system may identify an anaphoric expression to use to refer to a referent based at least in part on the referent's gender. For instance, processing the template shown in Table 4 below generates the text: "Mary

TABLE 4 insert(maryReferent) bought a computer. insert(maryReferent) is so happy!
insert(johnReferent) bought a computer. insert(johnReferent) is so happy!

bought a computer. She is so happy! John bought a computer. He is so happy!" As another example, the NLG system may identify an anaphoric expression to refer to a referent based on the grammatical number of the referent. In this way, text such as "Mary and John bought a computer. They are so happy" may be generated.

In some embodiments, language options to use for referring to a referent may include multiple referential expressions and/or multiple anaphoric expressions. For example, if multiple anaphoric expressions (e.g., "she", "our client," and "this client") were specified for the referent "maryReferent" in the illustrative template of Table 4, the NLG system may generate different text from the template based on which of the anaphoric expressions it selects to replace the second instance of the insert(maryReferent) tag. That is, the NLG system could produce "Mary bought a computer. She is so happy!" or "Mary bought a computer. This client is so happy!" or "Mary bought a computer. Our client is so happy."

The NLG system may identify a referential or anaphoric expression among multiple referential or multiple anaphoric expressions, respectively, in any suitable way. In some embodiments, the NLG system may identify the referential/anaphoric expression randomly among the set of possible referential/anaphoric expressions. In other embodiments, the NLG system may identify the referential/anaphoric expression to reduce repetition of particular referential/anaphoric expressions in the generated text.

In some embodiments, the NLG system may identify language to use for referring to a referent in the template based at least in part on the information about a generated (or determined to be generated) reference to the referent. The NLG system may identify language to use for referring to a referent based on the grammatical number and/or the gender of a generated (or determined to be generated) reference to the referent. This may allow the NLG system to use references having different grammatical number and/or gender consistently when referring to the same referent. For example, the template shown in Table 5 has multiple tags serving as placeholders for the referent "theEarrings," and the NLG system may use either the referential expression "the earrings the customer has bought" or one of three anaphoric expressions "this jewel," "it" or "they" to refer to the earrings.

TABLE 5 insert(theEarrings) isAre(theEarrings) beautiful. insert(theEarrings) isAre(theEarrings) made of diamonds. In addition, insert(theEarrings) hasHave(theEarrings) a lifetime warranty. insert(theEarrings) isAre(theEarrings) truly very nice.

When generating text from the template shown in Table 5, the NLG system may replace the first instance of the insert(theEarrings) tag with the referential expression "The earrings the customer has bought," and because this referential expression is plural, the NLG system may replace the second instance of the insert(theEarrings) with an anaphoric expression (e.g., "They") whose grammatical number is plural. In this way the grammatical number of these two references is consistent. Continuing with this example, the NLG system may replace the third instance of the insert (theEarrings) tag with the anaphoric expression "This jewel," (e.g., by choosing this anaphoric expressions among the set of possible anaphoric expressions to reduce repetition) and because this anaphoric reference is singular, the NLG system may replace the fourth instance of the insert (theEarrings) tag with an anaphoric expression (e.g., "It") whose grammatical number is singular. As a result, the NLG system may process the template of Table 5 to generate the text "The earrings the customer has bought are beautiful. They are made of diamonds. In addition, this jewel has a lifetime warranty. It is truly very nice."

As previously described, in some embodiments, the NLG system may determine whether using an anaphoric expression to refer to a particular referent would result in the insertion of an ambiguous reference in the generated text. When the NLG system determines that replacing a placeholder for a reference to a referent with an anaphoric expression for the referent would result in the insertion of an ambiguous reference, the NLG may instead replace the placeholder with a referential expression for the referent to avoid the insertion of an ambiguous reference.

The NLG system may determine that replacing a placeholder for a reference to a referent with an anaphoric expression for the referent would result in the insertion of an ambiguous reference using any suitable technique(s). One such technique, described with respect to FIG. 5A, may be used to detect referential ambiguities that may arise when a reference to a first referent occurs between two references to second referent of the same type as the first referent. An example of such a technique proceeds as follows. To determine whether using an anaphoric expression for a first referent at a first location in the template (e.g., an anaphoric expression referring to the referent X at location 500 in the template as shown in FIG. 5A) results in the insertion of a referential ambiguity, the NLG system may:

(1) determine whether the system has generated (or has determined to generate) a reference to the first referent at a second location preceding the first location in the template (e.g., a reference to referent X at location 502 that precedes location 500 in the template); and (2) determine whether the system has generated (or has determined to generate) a reference to a second referent, either of the same type as the first referent or specified as being mutually ambiguous with the first referent, at any location between the first and second locations (e.g., whether there is a reference to a referent Y at any location in the template between locations 500 and 502).

Figure 5A:
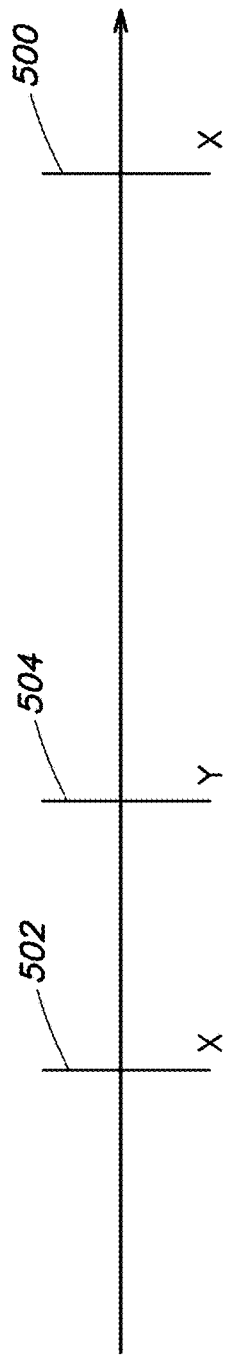
FIGS. 5A and 5B are diagrams for illustrating some situations in which referring to a referent by using an anaphoric expression may result in the insertion of an ambiguous reference in generated natural language text, in accordance with some embodiments.

When the NLG system determines that it has generated (or has determined to generate) a reference to the second referent between the first and second locations (e.g., a reference to referent Y at location 504, as shown in FIG. 5A), the NLG system may determine that inserting an anaphoric expression for the first referent at the first location (e.g., an anaphoric reference to referent X at location 500) may result in the insertion of an ambiguous reference.

This technique may be illustrated further by applying it to generate text from the example template shown in Table 2. Suppose the NLG system has already generated the text: "Mary went to the cinema yesterday. Jennifer met her at the end of the movie." Next, the NLG system proceeds to determine whether replacing the third placeholder tag insert (Mary) with the anaphoric expression "she" to refer to the referent Mary would result in the insertion of an ambiguous reference. According to the above technique, the NLG system would determine that inserting "she" would result in an ambiguous reference in the text because the generated text includes a reference to the referent Mary (in the first sentence), a reference to another referent Jennifer at a location between the first reference to Mary and the location of the third tag insert(Mary), and that Jennifer and Mary are referents of the same type because both are persons of the same gender. Indeed, inserting the anaphoric expression "she" for the third placeholder tag would result in the generation of the text: "Mary went to the cinema yesterday. Jennifer met her at the end of the movie. She was wearing a grey skirt." On the other hand, by using the above-described technique, the NLG system may detect that inserting "she" for the third placeholder tag would result in an ambiguity and, instead, use a referential expression for Mary to generate the text: "Mary went to the cinema yesterday. Jennifer met her at the end of the movie. Mary was wearing a grey skirt." This technique is further described below in Section 5.

Figure 5B:
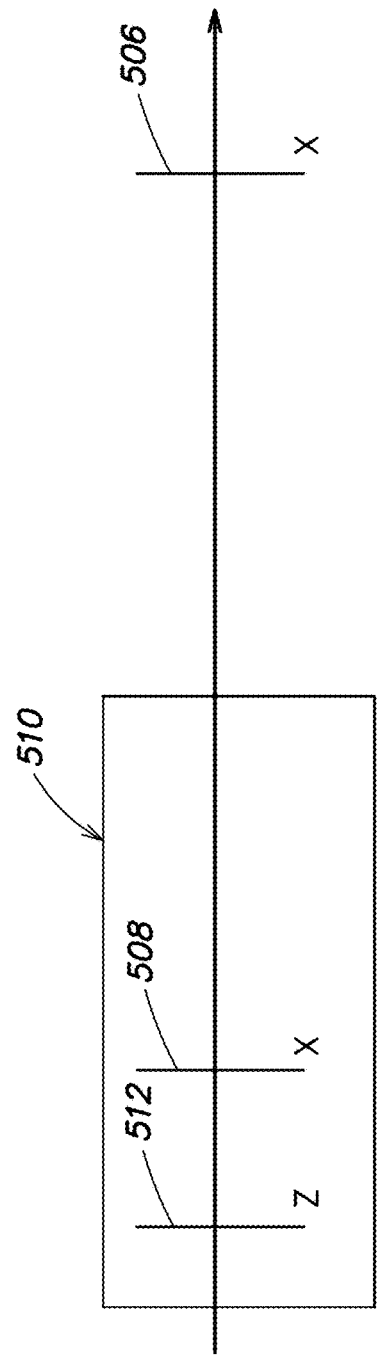

Another example technique for detecting referential ambiguities proceeds as follows. To determine whether using an anaphoric expression for a first referent at a first location (e.g., an anaphoric expression referring to the referent X at location 506 in the template, as shown in FIG. 5B) results in the insertion of a referential ambiguity, the NLG system may:

(A) determine whether the system has generated (or has determined to generate) a second reference to the first referent at second location preceding the first location in the template (e.g., a reference to referent X at location 508 that precedes location 506 in the template);

(B) identify any generated (or determined to be generated) references to any other referent, either of the same type as the first referent or specified as being mutually ambiguous with the first referent, in a specified neighborhood of the second location (a neighborhood of a location in text, such as neighborhood 510 of location 508, may be any text within a threshold distance (e.g., a threshold number of characters, words, sentences, and/or paragraphs) of the location); and (C) determine, for each identified reference in the neighborhood (e.g., for reference to referent Z at location 512), whether the referent to which the identified reference refers (e.g., referent Z) and the first referent X are ambiguous. This is described in more detail below.

When, at (C), the NLG system determines that the first referent (e.g., referent X) and any referent to which the identified reference refers (e.g., referent Z) are ambiguous, the NLG system may determine that inserting an anaphoric expression for the first referent at the first location results in the insertion of an ambiguous reference.

The NLG system may determine whether two referents are ambiguous, at act (C) of the above-described technique, in any suitable way. In some embodiments, the NLG system may determine whether first and second referents are ambiguous if the NLG system determines that there exists a pair of references including a reference to the first referent (e.g., any anaphoric reference to the first referent) and a reference to the second referent (e.g., any anaphoric reference to the second referent) that are ambiguous. The NLG system may determine that a pair of references, including a first reference to a first referent and a second reference to a second referent, is ambiguous based on factors including, but not limited to, the grammatical number of the first reference, grammatical number of the second reference, the gender of the first reference, the gender of the second reference, whether the first reference is a pronoun, whether the second reference is a pronoun, and the language of the human-language text in the template. In some embodiments, the NLG system may determine whether two references are ambiguous based on the technique described below in Section 5.4.

This technique may be further illustrated by applying it to generate text from the example template shown in Table 6 below.

TABLE 6 insert(Mary) went to the cinema yesterday. insert(Jennifer) met her at the end of the movie. insert(Jennifer) was wearing a grey skirt.

Suppose the NLG system has already generated the text: "Mary went to the cinema yesterday. Jennifer met her at the end of the movie." Next, the NLG system needs to determine whether replacing the third placeholder tag insert(Jennifer) with the anaphoric expression "she" to refer to the referent Mary would result in the insertion of an ambiguous reference. According to the second ambiguity situation detection technique described above, the NLG system would determine that there is an ambiguity because the generated text includes a second reference to Jennifer (in the second sentence), a reference to another referent Mary in the neighborhood of the second reference, the referents Mary and Jennifer are of the same type, and the reference to Jennifer (in the second sentence) and the reference to Mary (in the first sentence) are ambiguous, according to the technique described in Section 5.4, because each of the referents may be referred to by an anaphoric expression having a feminine gender (i.e., "she").

In some instances, insertion of an anaphoric reference to a referent in the presence of another reference to a second referent may introduce an ambiguity into the generated text even if the referents are not of the same type (e.g., people and objects, people and animals, two different types of objects, etc.). For example, the anaphoric reference "they" is ambiguous in the text: "The two little dogs are very cute. Mr. and Mrs. Smith built them a new dog house. They are very happy." The above-described ambiguity situation detection techniques may identify when such ambiguities arise when referents of different types (e.g., the referents being referred to by "the two little dogs" and "Mr. and Mrs. Smith") are identified (e.g., by a user) as being mutually ambiguous.

In some embodiments, a template may comprise one or more placeholders for references each referring to multiple referents. For example, the first placeholder tag insert([johnReferent, maryReferent]) in the template of Table 7 is a placeholder for a reference to multiple referents. In such embodiments, the NLG system may identify language with which to replace a placeholder for a reference based on whether the reference is to one or multiple referents. The NLG system may identify language with which to replace a placeholder for a reference to multiple referents (e.g., two, three, four, five, . . . ) with a plural referential or anaphoric expression for referring simultaneously to each of the multiple references. As an illustrative and non-limiting example, when the template comprises a placeholder for a reference to a first referent and a second referent, the NLG system may replace the placeholder with a plural referential/anaphoric expression for referring simultaneously to both the first referent and the second referent. Accordingly, the NLG system may process the template of Table 7 to produce the text: "Mr. and Mrs. Smith are loyal customers. He is 40 years old. She is 43 years old."

As described in Section 6 below, the ambiguity situation detection algorithms may be used to identify ambiguities among references in the generated text even when one or more of these references is a reference to multiple referents.

TABLE 7 insert([johnReferent, maryReferent]) are loyal customers.
    insert(johnReferent) is 40 years old. insert (maryReferent) is 43 years old.

In some embodiments, an NLG system may generate text comprising one or multiple possessive references. A possessive reference (e.g., "Mr. Smith's boat," "his boat," "this customer's boat," etc.) is an expression indicating possession/ownership of one referent (e.g., "boat") by another referent (e.g., Mr. Smith). A possessive reference may comprise a referential expression for referring to the owner referent. For example, "Mr. Smith's" is a referential expression for referring to the owner referent in the possessive reference "Mr. Smith's boat." A possessive reference may comprise an anaphoric expression for referring to the owner referent. For example, "his" is an anaphoric expression for referring to the owner referent in the possessive reference "his boat."

In some embodiments, a template may comprise one or more placeholders for possessive references and the NLG system may identify one of multiple possessive references to use in lieu of each such placeholder. Each placeholder for a possessive reference may identify the owner and owned referents. One such template is illustrated in Table 8 below. The illustrated template includes two instances of the tag insertPossessive(johnSmith,boat) serving as placeholders for possessive references indicating possession of the boat by John Smith.

TABLE 8 insert(johnSmith) bought a new boat. insertPossessive(johnSmith,boat) is very beautiful.
    Additionally, insertPossessive(johnSmith, boat) is very fast.

The NLG system may identify one of multiple possessive references to use in lieu of each placeholder for a possessive reference in any suitable way. In some embodiments, the NLG system may determine whether to use a possessive reference comprising a referential expression for the owner referent or a possessive reference comprising an anaphoric expression for the owner referent. The NLG system may make this determination using any of the techniques described herein for determining whether to use an anaphoric or a referential expression to refer to a referent. As a non-limiting example, the NLG system may determine to use an anaphoric expression to refer to the owner referent when the NLG system has generated text comprising a referential expression for the owner referent.

When the NLG system determines to use a referential expression for the owner referent, the NLG system may generate a possessive reference comprising the referential expression and a referential expression for the owned referent (e.g., generating "Mr. Smith's boat"). When the NLG system determines to use an anaphoric expression for the owner referent, the NLG system may generate a possessive reference comprising the anaphoric expression and a referential expression for the owned referent (e.g., generating "His boat"). Thus, the NLG system may process the first two sentences of the template in Table 8 to produce the text: "Mr. Smith bought a new boat. His boat is very beautiful."

In some embodiments, the NLG system may determine to use a non-possessive anaphoric expression for the owned referent (e.g., "it") in lieu of a placeholder for a possessive reference (e.g., insertPossessive(johnSmith, boat)). The NLG system may make such a determination upon determining that the NLG system is to use an anaphoric expression for the owned referent using any of the techniques described herein. Thus, the NLG system may process the third sentence of the template in Table 8 to produce the text: "Mr. Smith bought a new boat. His boat is very beautiful. It is very fast."

In some embodiments, a user may provide input to modify the way in which the NLG system identifies, among multiple language options, the language to use for referring to a referent. For example, the user may input a user-specified rule (or rules), e.g., a 'local heuristic', that may be used by the NLG system, together with or instead of one or more system rules, to identify automatically the language to use to refer to a referent. The user-specified rule(s) may identify the language to use to refer to a referent as a function of any suitable information accessible by the NLG system (e.g., how many references to the referent have been inserted in the text, whether the last reference to the referent was referential or anaphoric, the gender/grammatical number of the referent, the gender/grammatical number of the last reference to the referent, etc.). As another example, the user may provide input, for a tag serving as a placeholder for a referring expression, indicating that the NLG system should replace the tag with a specific type of referring expression (e.g., an anaphoric expression or a referential expression) or a specific referring expression (e.g., "Mr. Smith"). The user may provide input to modify the way in which the NLG system identifies language to use for referring to a referent in any suitable way (e.g., within a placeholder for the referent) and in any suitable format, as aspects of the disclosure provided herein are not limited in this respect.

In some embodiments, the user may specify values for one or more parameters (e.g., parameters 159) used by the NLG system to generate text. For example, the user may specify a "scope of visibility" parameter based on which the NLG system determines how far back in a template, from a placeholder for a reference to a referent, to search in order to identify one or more previous references to the referent. The scope of visibility parameter may indicate that the NLG system should search within a threshold number of characters, words, or paragraphs to identify one or more previous references to the referent. As another example, the user may specify a parameter based on which the NLG system determines the size of a neighborhood of a reference to a referent when determining whether using an anaphoric reference to that referent results in the insertion of a referential ambiguity in the generated text.

In some embodiments, the NLG system may be configured to identify language to use for referring to two or more referents so as to maintain parallel structure among references in the generated text. For example, if the text: "Once upon a time, an old man and an old woman owned two cows," was generated, the NLG system may process the template: "insert(theOldMan) took them to pasture every day, while insert(theOldWoman) turned their milk into butter," by replacing the placeholder tags with anaphoric expressions having parallel structure (e.g., "he" and "she", "the man" and "the woman", etc.). This is further described in Section 8 below.

An illustrative implementation of a computer system 600 that may be used in connection with any of the embodiments of the disclosure provided herein is shown in FIG. 6. The computer system 600 may include one or more processors 610 and one or more articles of manufacture that comprise non-transitory computer-readable storage media (e.g., memory 620, one or more non-volatile storage media 630, etc.). The processor 610 may control writing data to and reading data from the memory 620 and the non-volatile storage device 630 in any suitable manner, as the aspects of the disclosure provided herein are not limited in this respect. To perform any of the functionality described herein, the processor 610 may execute one or more processor-executable instructions stored in one or more non-transitory computer-readable storage media (e.g., the memory 620), which may serve as non-transitory computer-readable storage media storing processor-executable instructions for execution by the processor 610.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (FIGS. 2 and 4) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Some aspects of the technology described herein may be understood further based on the non-limiting illustrative embodiments described below in Sections 1-8. Any limitations of the embodiments described below in Sections 1-8 are limitations only of the embodiments described in Sections 1-8, and are not limitations of any other embodiments described herein.

1. An Initial Example

An anaphora is a process that turns an extra-linguistic referent into a word or group of words depending upon the context and allows a human-being reader to identify this referent. This process reproduces a general cohesion mechanism within a discourse whose function is to a ensure thematic coherence of a text, that is to say, to organize the content of this text in a structured and understandable path.

The basic mechanism relies on two sets of available candidates (or expressions):
Referential Expression—word or set of words to identify an extra-linguistic referent without any local context.
Anaphora Expression—a word or set of words to "pick out" (or refer to) an extra-linguistic referent through a co-reference link with the last Referring Expression generated previously.

These two sets of candidates are used to generate a Referring Expression. The textual referring expression of a referent, whether referential or anaphoric, is called a reference.

The basic mechanism is as follows: as soon as a reference already exists in the upstream written text, that is linked to the same referent, the system may generate an anaphora. Thus, instead of writing the following sentence:
The product is awesome. The product matches your need. The product is cheap it will generate:
The product is awesome. It matches your need. It is cheap.

2. First Implementation and Algorithm

Figure 7:
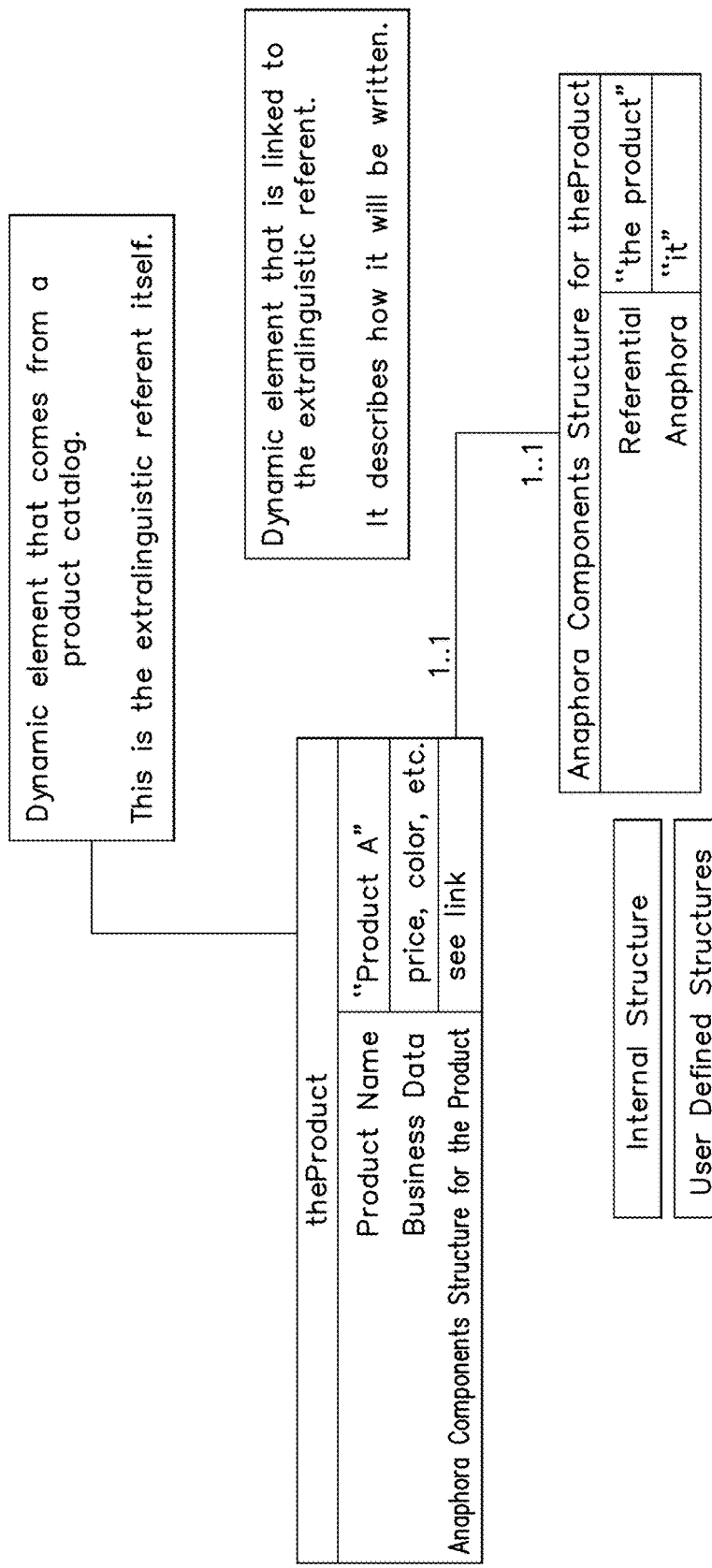

To generate the previous sentence, the implementation relies on the following elements. First of all are the elements created explicitly by a user as shown in FIG. 7.

Two elements are then required to be created by the user:
The Referent (theProduct in the schema): Referents are business elements (ie. extralinguistic). They can be products from a catalog, buildings or any other elements. A referent may have non-linguistic characteristics (color, price, etc.) and linguistic-related characteristics (name, native gender, native number, etc.)
The Anaphora Components Structure: This structure is a linguistic structure. It contains information regarding how to write a group of referents that have a common nature. To describe this, two pieces of information are requested:
one for the Referential Expression.
another one for the Anaphora Expression.

The two elements are bound through a 1 to many relationship, which means:
One referent element is related to 0 or 1 Anaphora Components Structure element
One Anaphora Components Structure element is related to 0 or many referents elements.

Figure 8:
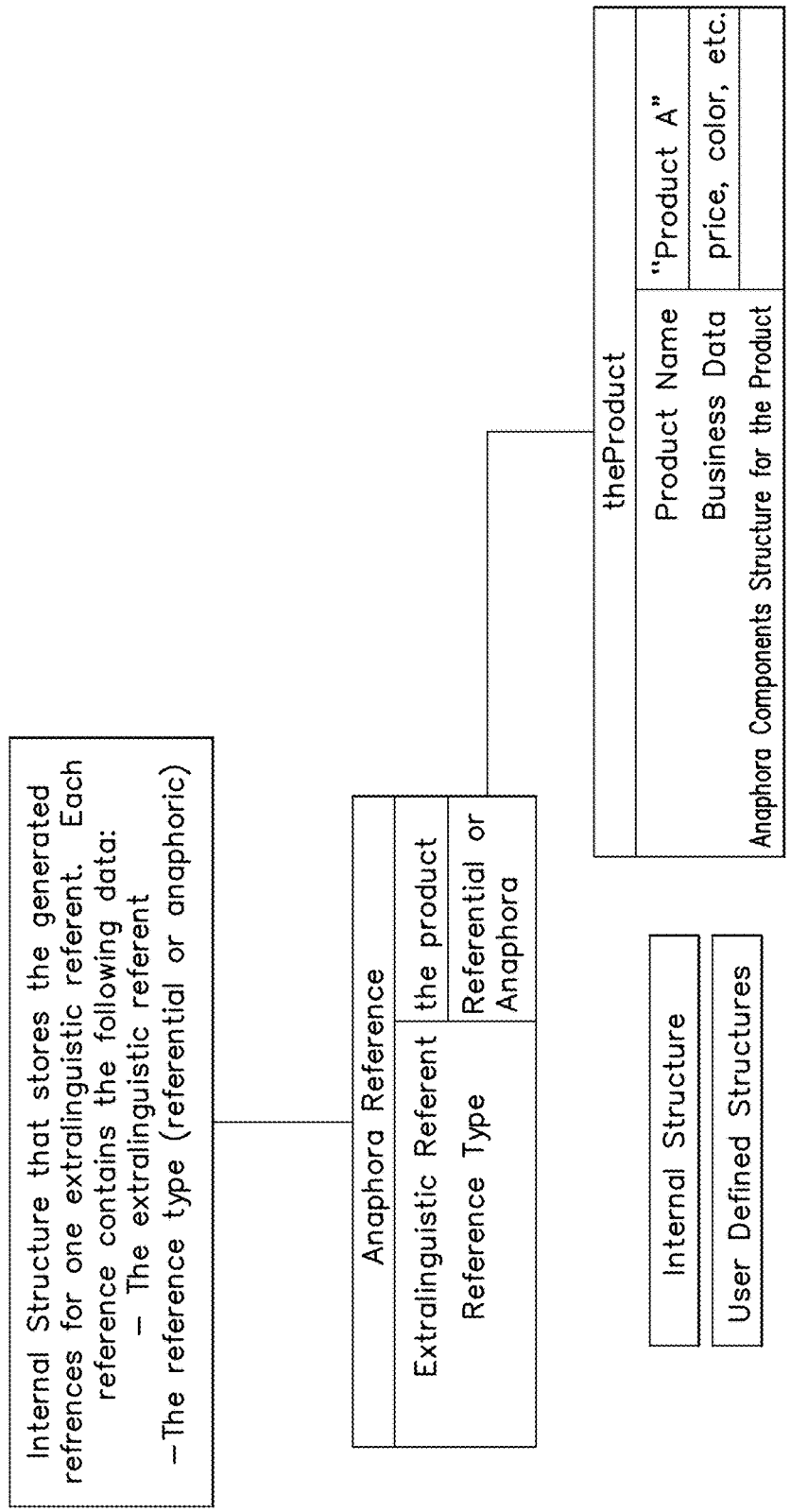

Then, the system uses internal Anaphora Reference objects linked to the referent, as illustrated in FIG. 8. There are as many Anaphora Reference objects as referents in the written text.

The user also defines the template of the text. The template can take this form: insert(theProduct) is awesome. insert(theProduct) matches your need. insert(theProduct) is cheap. To generate the sample sentence, the algorithm goes through the template of the text and also uses the dedicated Anaphora Components Structure as follows:

TABLE 9

| Code | Algorithm Details | Generated text |
|---|---|---|
| insert(theProduct) | Asks the Anaphora Reference object if there is a pre-existing reference linked to theProduct.<br>  the answer is no<br>consider inserting a referential expression<br>choose one available referential expression: "The Product"<br>  insert the referential expression : "The product"<br>  insert a reference in the Anaphora Reference object:<br>    referent : theProduct<br>    referenceType:: referential<br>  capitalize it as it's a start of sentence | The Product |
| is awesome. | static text | is awesome. |
| insert(theProduct) | Asks the Anaphora Reference object if there is a pre-existing reference linked to theProduct.<br>  the answer is yes<br>consider inserting an anaphoric expression<br>choose one available anaphoric expression: "it"<br>Insert the anaphoric expression : "it"<br>capitalize it as it's a start of sentence. | It |
| matches your need. | static text | matches your need. |
| insert(theProduct) | Asks the Anaphora Reference object if there is a pre-existing reference linked to theProduct.<br>  the answer is yes<br>consider inserting an anaphoric expression<br>choose one available anaphoric expression: "it" | |

TABLE 9-continued

| Code | Algorithm Details | Generated text |
|---|---|---|
| is cheap | Insert the anaphoric expression : "it" capitalize it as it's a start of sentence. static text | It is cheap |

3. Limiting the Search Scope

In the algorithm above, the system scrutinizes through the Anaphora Reference elements, the upstream text content in order to identify a pre-existing reference linked to the theProduct extra-linguistic element. This lookup is limited to a certain scope of visibility beyond which the system stops looking at references. At this point, the scope of visibility is limited to the current paragraph. So all the text that doesn't belong to the current paragraph will be ignored by the lookup process.

4. Gender and Number Impacts 4.1 Referent Gender/Number Impacts

In the two next examples, the anaphora expression depends on the gender and number of the previous gender and number.

Mary bought a computer. She is so happy!
John bought a computer. He is so happy!

We can manage this using the previous algorithm by creating two anaphora components data structures, one for Mary and one for John:

anaphora components data structure for Mary:
referential: Mary
anaphora: she
anaphora components data structure for John:
referential: John
anaphora: he Though, things are getting tedious as the number of the objects grows up: Mary and John are not alone on Earth, products may come dynamically from a catalog, etc. Moreover, the construction of the Anaphora Components Structures is very simple:

referential: the person's first name
anaphora: if last referent gender is Masculine, then "he", if Feminine, "she"

Thus it makes sense to have a dynamic anaphora structure for all objects of the same nature. There are two impacts on the implementation above:

The anaphora candidate can't be static and must therefore be dynamic (to generate he or she)
When inserting an anaphora, the system must know the referent's gender.

Figure 9:
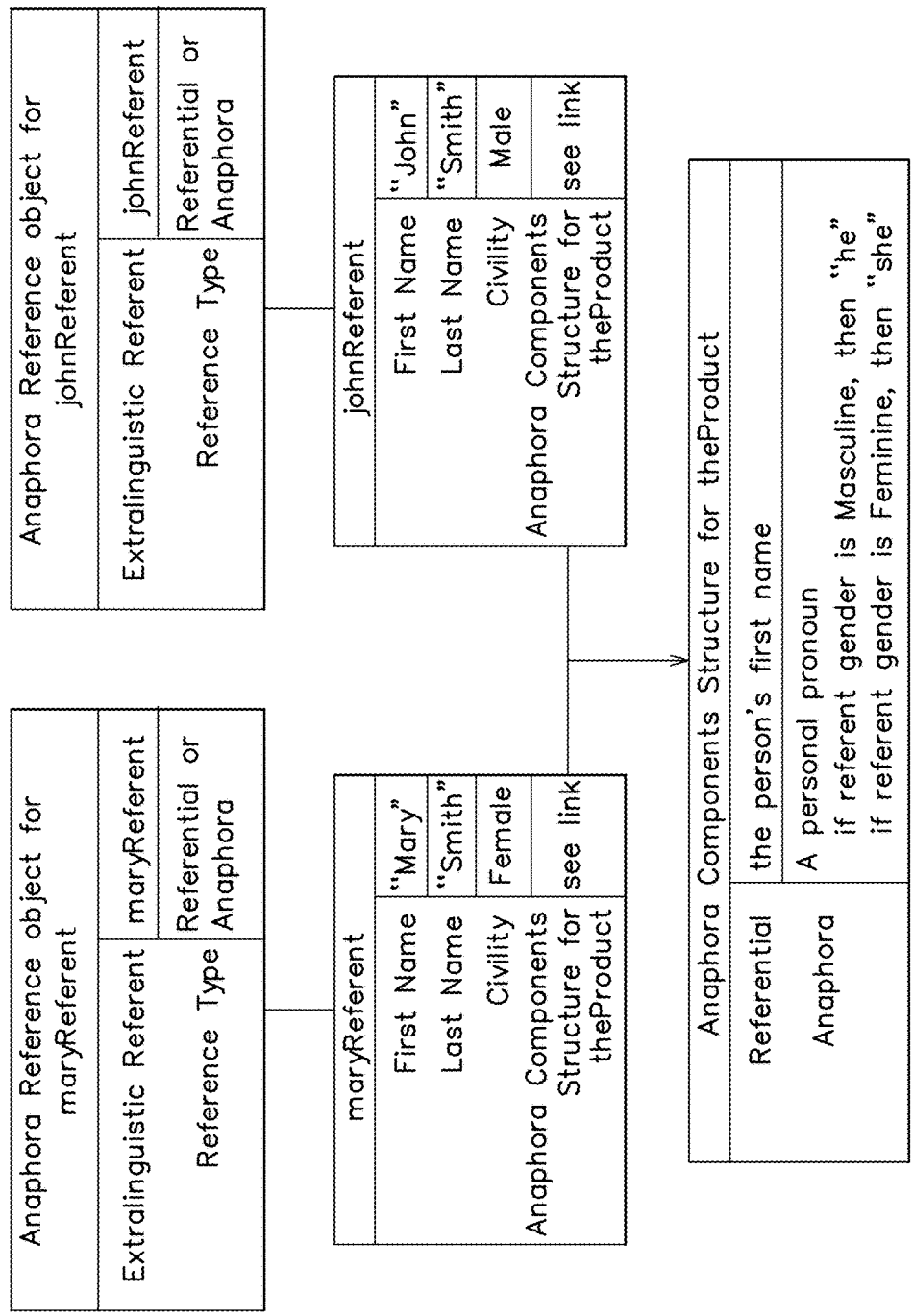

Then, as shown in FIG. 9, the following elements may be used:

Two referent elements (one for Mary, the other for John)
Two Anaphora Reference objects (one bound to the referent 'Mary', the other one bound to the referent 'John')
One single Anaphora Component Structure, shared between Mary and John.

The elements maryReferent and johnReferent are different, but their Anaphora Components Structure is common. The Anaphora Components Structure is dynamic and is able to pick up data from the referent object (such as the referent's first name for example) or in the Anaphora Reference object (to gather the gender and a number and to display 'he' or 'she')

The text template is: insert(maryReferent) bought a computer. insert(maryReferent) is so happy! The resultant algorithm is shown below in Table 8

TABLE 10

| Code | Algorithm Details | Generated text |
|---|---|---|
| insert(maryReferent) | Asks the Anaphora Reference object if there is a pre-existing reference linked to maryReferent. the answer is no consider inserting an referential expression choose one available referential expression: maryReferent's first name Insert the referential expression: "Mary" insert a reference in the Anaphora Reference object: referent : maryReferent reference type:: referential | Mary |
| bought a computer. | static text | bought a computer. |
| insert(maryReferent) | Asks the Anaphora Reference object if there is a pre-existing reference linked to maryReferent. the answer is yes consider inserting an anaphoric expression choose one available anaphoric expression: personal pronoun what is the referent's gender? FEMININE Insert the anaphoric expression: "she" capitalize it as it's a start of sentence. | She |
| is so happy! | static text | is so happy! |

The algorithm above works also when the referent's number varies. Consider the following sentence:

Mary and John bought a computer. They are so happy!

In this example, the referent is actually the Mary and John couple. The system takes this into account and write the expected personal pronoun: 'they.' To do this, the referent's number (singular or plural) is set on the referent object (through the field civility), and the Anaphora Component Structure is extended as follows:

if the referent's number is Plural, then "they"
else
   if the referent's gender is Masculine, then "he"
   if the referent's gender is Feminine, then "she"
   (as before)

4.2 the Anaphora Components Structure is a Dynamic Structure

Until now, all our examples are based on one single available anaphora expression. But in real life, we can have multiple available anaphora expressions (and referential expressions). For example in the sentence:

Mary bought a computer. She is so happy!

We can alternatively say:

Mary bought a computer. This client is so happy!
Mary bought a computer. Our client is so happy!

This feature is done easily by providing to the Anaphora Components Structure a collection of possible anaphora expressions instead of only one anaphora expression. At runtime, the system will choose an anaphora expression using a specific method. A basic approach is to choose it randomly, another is to give the priority to expression that minimizes the redundancies in the upstream text.

4.3 Current Gender And Current Number

That being said, with the previous implementation and algorithms along with multiple expressions choices, a problem frequently brings up. Consider the following sentence:

The earrings the customer has bought are beautiful. They are made of diamonds. In addition, this jewel has a lifetime warranty. It is truly very nice.

There are two different anaphora expressions:

The noun phrase: "This jewel"
or a personal pronoun: "they" or "it"

But this example differs from the first ones because the anaphora expression's number changes along the text. The second expression is plural (they) because it refers to 'the earrings'. The fourth expression is singular (it) because it refers to 'this jewel'.

Figure 10:
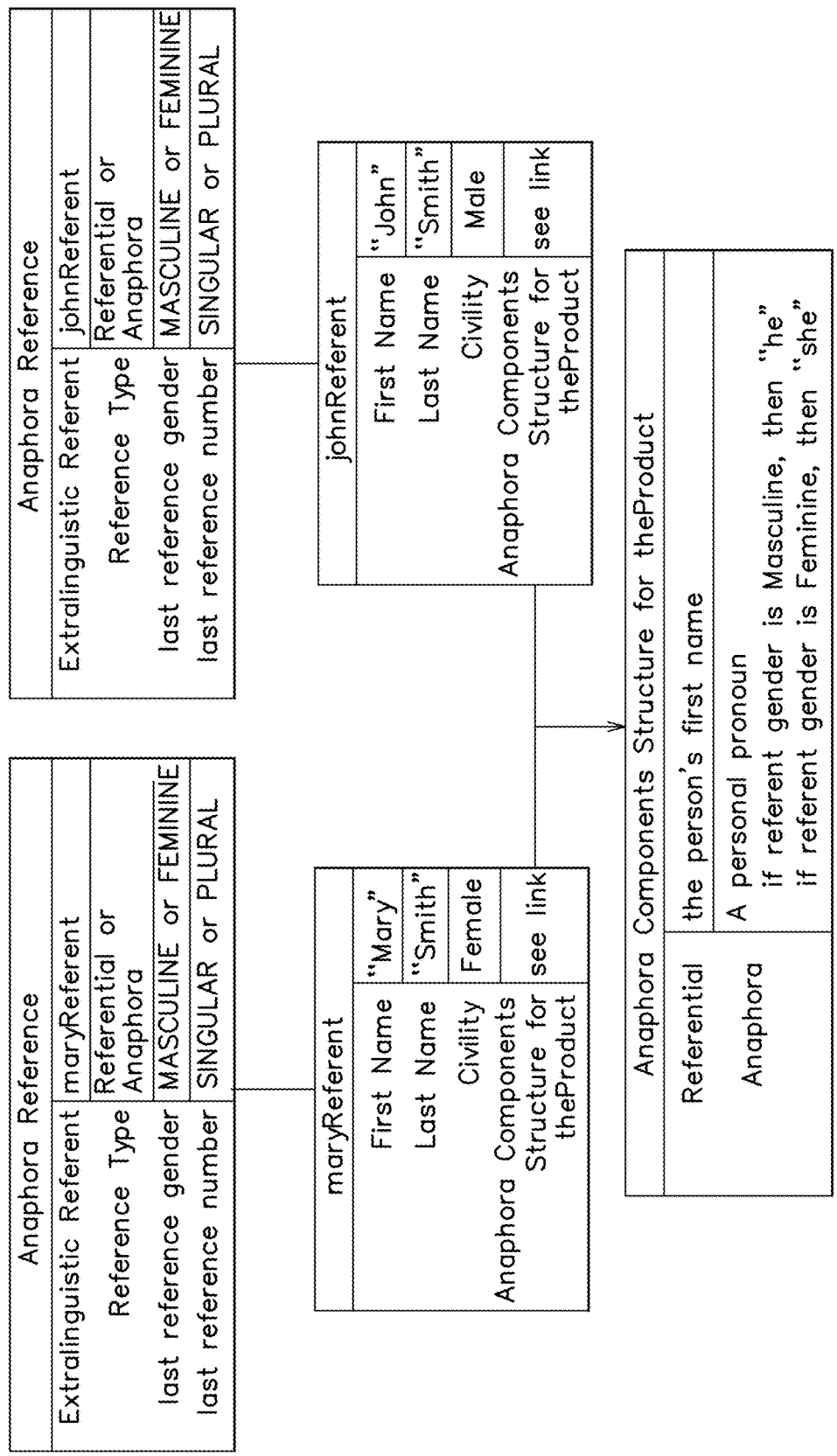

To address this situation, the system must not only know the referent's number, but it also has to know the last reference's number. In other words, the number of the last used expression for the current referent. The Anaphora Reference object is used to store this information. Its implementation is extended as shown in FIG. 10.

Let's see how it works with the following text template:

insert(theEarrings) isAre(theEarrings) beautiful. insert(theEarrings) isAre(theEarrings) made of diamonds. In addition, insert(theEarrings) hasHave(theEarrings) a lifetime warranty.
insert(theEarrings) isAre(theEarrings) truly very nice.

TABLE 11

| Code | Algorithm Details | Generated text |
|---|---|---|
| insert(theEarrings) | Asks the Anaphora Reference object if there is a pre-existing reference linked to theEarrings.<br>  the answer is no<br>  consider inserting a referential expression<br>  choose one available referential expression: "The earrings ..."<br>  Insert the referential expression : "The earrings ..."<br>  insert a reference in the Anaphora Reference object:<br>    referent : theEarrings<br>    reference type: referential<br>    last reference gender: INANIMATE<br>    last reference number: PLURAL<br>  capitalize it as it's a start of sentence. | The earrings the customer has bought |
| isAre(theEarrings) | Asks the Anaphora Reference object if there is a pre-existing reference linked to theEarrings.<br>  the answer is yes<br>  what was the last reference's number? PLURAL<br>  conjugate the verb 'to be' in the PLURAL form<br>  insert "are" | are |
| beautiful. | static text | beautiful. |
| insert(theEarrings) | Asks the Anaphora Reference object if there is a pre-existing reference linked to theEarrings.<br>  the answer is yes<br>  consider inserting an anaphoric expression<br>  choose one available anaphoric expression: personal pronoun<br>  what was the last expression's number? PLURAL<br>  Insert the anaphoric expression: "they"<br>  capitalize it as it's a start of sentence. | They |
| isAre(theEarrings) | Asks the Anaphora Reference object if there is a pre-existing reference linked to theEarrings.<br>  the answer is yes<br>  What was the last expression's number? PLURAL<br>  conjugate the verb 'to be' in the PLURAL form<br>  insert "are" | are |
| made of diamonds. In addition, | static text | made of diamonds. In addition, |
| insert(theEarrings) | Asks the Anaphora Reference object if there is a pre-existing reference linked to theEarrings.<br>  the answer is yes<br>  consider inserting an anaphoric expression | |

TABLE 11-continued

| Code | Algorithm Details | Generated text |
|---|---|---|
| | choose one available anaphoric expression: "this jewel"<br>Insert the anaphoric expression: "this jewel"<br>insert a reference in the Anaphora Reference object:<br>    referent : theEarrings<br>    reference type: anaphora<br>    last reference gender: INANIMATE<br>    last reference number: SINGULAR | this jewel |
| hasHave(theEarrings) | Asks the Anaphora Reference object if there is a pre-existing reference linked to theEarrings.<br>    the answer is yes<br>what was the last expression's number? SINGULAR<br>    conjugate the verb 'to have' in the SINGULAR form<br>    insert "has" | has |
| a lifetime warranty. | static text | a lifetime warranty. |
| insert(theEarrings) | Asks the Anaphora Reference object if there is a pre-existing reference linked to theEarrings.<br>    the answer is yes<br>    consider inserting an anaphoric expression<br>    choose one available anaphoric expression: personal pronoun<br>what was the last expression's number? SINGULAR<br>    Insert the anaphoric expression: "it"<br>    capitalize it as it's a start of sentence. | It |
| isAre(theEarrings) | Asks the Anaphora Reference object if there is a pre-existing reference linked to theEarrings.<br>    the answer is yes<br>what was the last expression's number? SINGULAR<br>    conjugate the verb 'to be' in the SINGULAR form<br>    insert "is" | is |
| truly very nice. | static text | truly very nice. |

As the system being a multilingual system, the grammatical rules of pronouns agreements depends on each locale specificities. The system takes into account the following parameters:

- Last Reference's gender
- Last Reference's number
- Grammatical role in the sentence (subject, object complement)

For example, in French, a noun can be masculine or feminine. The system uses the above algorithm to write the following sentence:

La nouvelle voiture présente de nombreux avantages. Elle est disponible immediatement. Ce véhicule dispose d'un GPS. Enfin, il consomme peu.

5. Resolving Ambiguous Situations

5.1 What is an Ambiguity?

When a text contains more than one extra-linguistic referent, ambiguities can bring up. By ambiguity, we mean, a situation where a representative anaphoric usage creates ambiguity that prevent the reader from uniquely identifying the referent and therefore from understanding correctly the meaning of the text. For example, consider the following text template:

insert(maryReferent) went to the cinema yesterday. insert(jenniferReferent) met her at the end of the movie. insert(maryReferent) had a blue skirt.

According to the previous algorithm, this statement will generate the following sentence:

Mary went to the cinema yesterday. Jennifer met her at the end of the movie. She had a blue skirt.

But who is referred by the pronoun 'she'? Mary or Jennifer? This is what we call an ambiguity. The system will detect that there is an ambiguous situation and will generate the following sentence instead:

Mary went to the cinema yesterday. Jennifer met her at the end of the movie. Mary had a blue skirt.

5.2 The Concept of a Reference's Neighborhood

To handle ambiguous situations, the system uses a concept called the reference's neighborhood. For a given inserted reference, we can define a neighborhood of this reference which will be the scope. The reference's neighborhood is the words and related contextual properties (such as current gender, other inserted reference, etc.) that are located within a certain range of characters from this reference. The certain range of characters is a system global parameter that may be customized.

In the following paragraph, the underlined text is the neighborhood of the personal pronoun 'he' (bold). This personal pronoun is a reference to the 'George Washington' referent.

> George Washington was the elected President as the unanimous choice of the 69 electors in 1788, and he served two terms in office. He oversaw the creation of a strong, well-financed national government that maintained neutrality in the wars raging in Europe, suppressed rebellion, and won acceptance among Americans of all types.

5.3 Anaphoric Ambiguity

Figure 11:
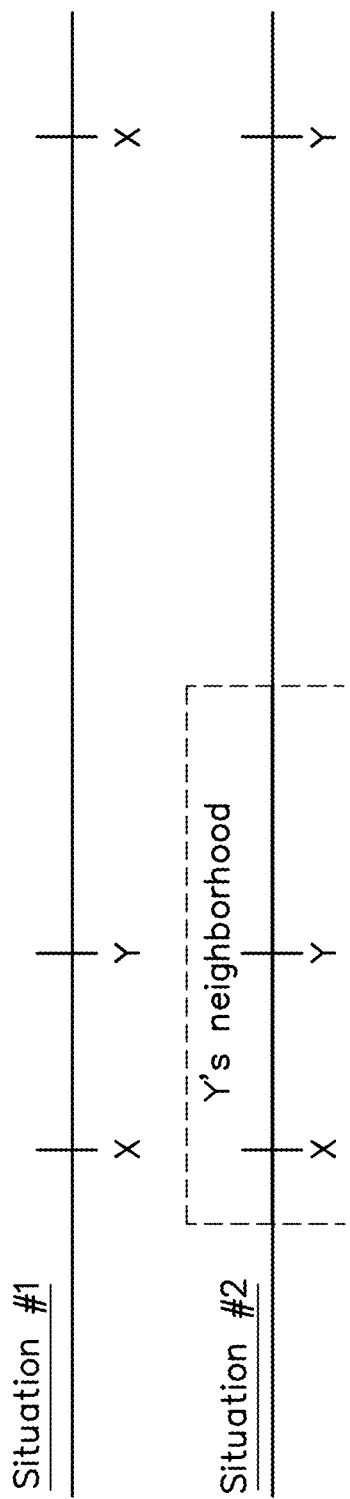
FIG. 11 is another diagram for illustrating some situations in which referring to a referent by using an anaphoric expression may result in the insertion of an ambiguous reference in generated natural language text, in accordance with some embodiments.

The previous examples lead us to the concept of an anaphoric ambiguity. In the system, there are two main situations, illustrated in FIG. 11, where an ambiguity may arise:

1. In the first situation #1, we want to insert an expression related to the X referent. Within the scope of visibility, a previously inserted reference to X does exist. But another reference Y (X and Y are of the same nature) comes between. In this case, the system always considers that there is an ambiguity. This is the above example:

Mary went to the cinema yesterday. Jennifer met her at the end of the movie. Mary had a blue skirt, 2. In the situation #2, we want to insert an expression related to the Y referent. Here, no X referent comes between the last two Y references. But a X reference exists in the Y reference's neighborhood. This is likely to bring up an ambiguity and a deeper analysis may be performed at this point. Example:

Mary went to the cinema yesterday. Jennifer met her at the end of the movie. Jennifer had a blue skirt.

Note that the ambiguous situation is created by the proximity of the two references. if Mary would have been further upstream in the text, there would have had no ambiguity as demonstrated in the example below (she refers to Jennifer):

Mary went to the cinema yesterday. She watched an old western that took place in the Monument Valley Navajo Tribal Park region. Monument Valley is a relatively flat plain surrounded by red cliffs where a lot of cowboys and Indians movies have been shot. Jennifer met her at the end of the movie. She had a blue skirt.

5.4 A Referent Ambiguities Detection Algorithm

To identify whether there is an ambiguity between the two referents X and Y, the system looks at the X and Y expressions. Since there could be different possible expressions for one referent the system will iterate through all the possible expression couples of X and Y and tests for each couple if there is an ambiguity (see below).

For example, let's consider the maryReferent element. As anaphora expressions, we can have for example two different values:

the personal pronoun 'she'
the noun phrase 'this client"

If we need to detect the ambiguity between johnReferent (X) and maryReferent (Y), we will test the following couple:

'she' (maryReferent) and 'he' (johnReferent)
'she' (maryReferent) and 'this client' (johnReferent)
'this client' (maryReferent) and 'he' (johnReferent)
'this client' (maryReferent) and 'this client' (johnReferent)

Then, for each couple, if the following condition is worth true, then the system concludes that there is an ambiguity between two expressions of the couple:

both are anaphora expressions (i.e.: not referential expression)
and either:
the two expressions are both personal pronoun:
and the two expressions have the same gender and the same number, whatever the generation language.
or:
at least one of the two expressions is not a personal pronoun (whatever the second one)
and both expressions have the same number
and language specific rules:
for example, in French: at least one of the two expressions is invariant with the gender
for example, in English: there is no additional rule: if the two previous conditions are checked, the two expressions are always ambiguous.

The system considers that the two referent are ambiguous when at least one single pair of expressions is ambiguous. That being said, under an ambiguous situation, the system considers there are two different possible scenarios:

Either the ambiguous situation concerns two objects of the same nature (two persons, to products, etc. . . . )

Or the ambiguous situation concerns two objects of two different natures (one persons and one product for example).

Let's start with the first scenario.

5.5. How the System Deals with Ambiguities on Two Objects of the Same Nature

Let's see how this algorithm works in the system. Consider the objects have been declared in the system:

TABLE 12

| maryReferent: object that refers to the person Mary | jenniferReferent: object that refers to the person Jennifer |
|---|---|
| firstName: "Mary" lastName: "Smith" native gender: Feminine native number: Singular | firstName: "Jennifer" lastName: "Smith" native gender: Feminine native number: Singular |

To sum up, the modelization is as described in FIG. 12.

The beginning of the sentence is generated using the algorithms described in the previous sections and won't be detailed again. At the time to write the last sentence ('She had a blue skirt'), the following ambiguity detection mechanism will be triggered:

In order to detect an ambiguity, the system will trace back the already written text until he finds a previously inserted reference or until it reaches the end of the scope of visibility. Remember, these references positions are stores in the Anaphora Reference objects. For each encountered reference, the system tests whether or not it's an ambiguity according the following algorithm.

The Ambiguity Situation Detection Algorithm

The Ambiguity Situation Detection algorithm relies on the Referent Ambiguities Detection algorithm and a reference forecasting mechanism. To have an expression ambiguity when writing a referent X, the following algorithm and conditions are proceeded (see also diagram below):

When the system is planning to write X using an anaphoric referring expression (this ensures that an Anaphoric Reference Holder linked to X exists)

The system searches for the last referential reference's neighborhood→Xr

Now, two situations can occur. Either

A Y reference is found between the X's position and Xr's position.
X and Y are of the same nature (both persons, or products, etc. . . . )
or
There is at least one reference in the Xr's neighborhood.
For each Z, as a Xr's neighbor (Z different from Xr):
X and Z are of the same nature (both persons, or products, etc. . . . )
Test if X and Z are ambiguous according to the previous algorithm If conditions in this algorithm are true, then, the system considers there is a situation of ambiguity. In detail. Let's suppose the system has already written:

Mary went to the cinema yesterday. Jennifer met her at the end of the movie . . .

TABLE 13

| Code | Algorithm Details | Generated text |
|---|---|---|
| insert(jenniferReferent) | Asks the jenniferReferent's Anaphora Reference object if there is a pre-existing reference<br>    the answer is yes<br>   consider inserting an anaphora expression.<br>   Look for an ambiguity situation with another referent using the Ambiguity Situation Detection algorithm explained above.<br>      There is an ambiguity: maryReferent, category Person belongs to the jenniferReferent's neighborhood. Both expressions have the same gender and will use a personal pronoun as an anaphora expression..<br>   Consider inserting a referential expression for jenniferReferent<br>   Choose one available referential expression: jenniferReferent's first name<br>   Insert the referential expression : "Jennifer"<br>   insert a reference in the Anaphora Reference object:<br>      referent : jenniferReferent<br>      lastExpressionType: referential<br>      lastGender: FEMININE<br>      lastNumber: SINGULAR<br>   capitalize it as it's a start of sentence. | Jennifer |
| had a blue skirt | static text | had a blue skirt |

It is important to note that, as mentioned in the Referent Ambiguities Detection algorithm, the ambiguous situation comes from the fact that both referents have the same gender (in English, only there is only a condition on the gender when there are two personal pronouns). The following examples doesn't create an ambiguity because the two anaphora expressions have two different genders (masculine and feminine):

Mary went to the cinema yesterday. John met her at the end of the movie. She had a blue skirt.

Mary went to the cinema yesterday. John met her at the end of the movie. He had a blue pant.

In these cases, the process generates directly anaphoric expressions with the standard algorithm. Lastly, if we had the following text template statement:

insert(maryReferent) went to the cinema yesterday. insert (jenniferReferent) met her at the end of the movie. insert(maryReferent) had a blue skirt.

The system will also have identified an ambiguous situation: the jenniferReferent that comes between the two maryReferent references creates an ambiguous situation.

The final generated sentence would be:

Mary went to the cinema yesterday. Jennifer met her at the end of the movie. Mary had a blue skirt.

5.6 how the System Deals with Ambiguities on Two Objects of Different Natures

Figure 13:
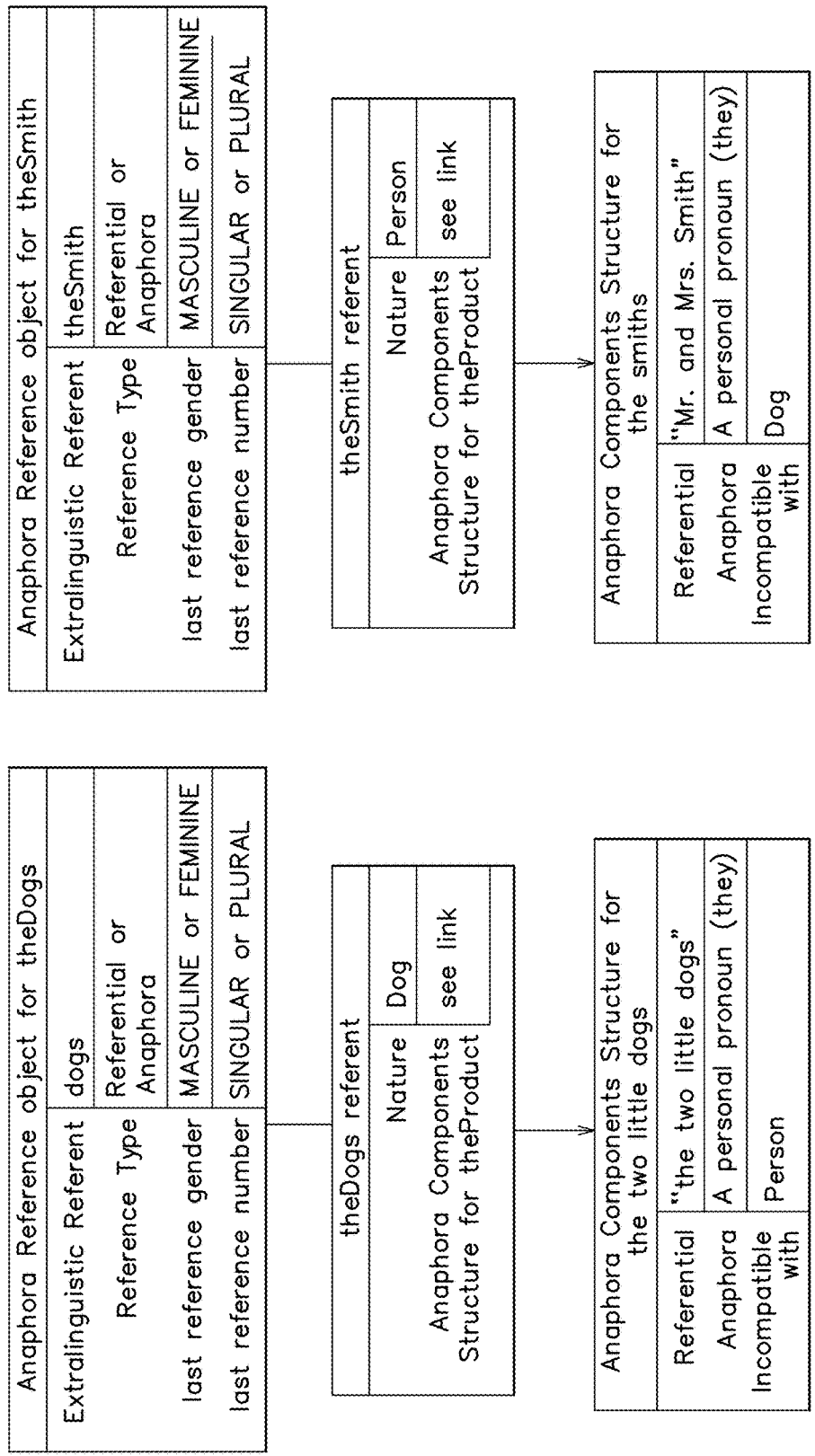

In general, when the above situation occurs with two different natures, the system consider that there is no ambiguity. For example:

The little dog was barking all day long but the house's door kept closed. it was very sad The reader can easily understand the meaning, even if grammatically speaking, 'it' can refer to 'the house's door'. But this is not always the case as shown in the example below:

The two little dogs are very cute. Mr. and Mrs. Smith built them a new doghouse. They are very happy In that case, the previously ambiguity detection mechanism does not apply automatically. To handle this case of ambiguous references, it is possible to explicitly mark certain references mutually explanatory. The internal modelisation is as shown in FIG. 13.

The Ambiguity Situation Detection algorithm is changed as follows:

When the system is planning to write X using an anaphoric referring expression (this ensures that an Anaphoric Reference Holder linked to X exists)

The system goes back in the written text until it reaches the last referential expression linked to X.

Either

Before reaching the previous X reference position, the system reaches another reference linked to Y X and Y are of the same nature (both persons, or products, etc. . . . ) or declared as mutually ambiguous or The system reaches the previous X reference position From this position, the system looks for other references in the X's neighborhood For each Y, as a X's neighbor:

Considering Y, a X's neighbor (X different from Y):

X and Y are of the same nature (both persons, or products, etc. . . . ) or declared as mutually ambiguous Test if X and Y are ambiguous according to the previous algorithm The beginning of the sentence is written as previously:

"The little dog was barking all day long. Mr. and Mrs. Smith built them a new doghouse."

TABLE 14

| Code | Algorithm Details | Generated text |
|---|---|---|
| insert(twoLittleDogsReferent) | Asks the Anaphora Reference object if there is a pre-existing reference linked to twoLittleDogsReferent. | The two little dogs |

TABLE 14-continued

| Code | Algorithm Details | Generated text |
|---|---|---|
| | the answer is yes<br>Consider inserting an anaphora expression<br>Look for an ambiguity situation with another referent according to the algorithm above..<br>    Yes, there is an ambiguity: theSmithsReferent, category Person. Defined as mutually ambiguous, "they" would be written in both cases<br>Consider inserting a referential expression for twoLittleDogsReferent<br>    choose one available referential expression: "the two little dogs"<br>    Insert the referential expression : "the two little dogs"<br>    insert a reference in the Anaphora Reference object:<br>        referent : twoLittleDogsReferent<br>        lastExpressionType: referential<br>        lastGender: INANIMATE<br>        lastNumber: PLURAL<br>capitalize it as it's a start of sentence. | |
| are very happy | static text | are very happy. |

The second mechanism of the last section, based on the references' proximity also apply in this case.

6. Multiple Same-Type References Insertion

Let's consider the following sentence:
Mr. Smith wears a blue hat. Mrs Smith wears a red dress. They are both well-dressed The personal pronoun 'they' refers to Mr. and Mrs. Smith. In other words, it refers to a collection of items of the same nature (here, both Mr. and Mrs. Smith are of a 'person' nature). The previous algorithms are not shaped to deal with items collections. when writing a referent, you cannot provide several items at the same time.

Figure 14A:
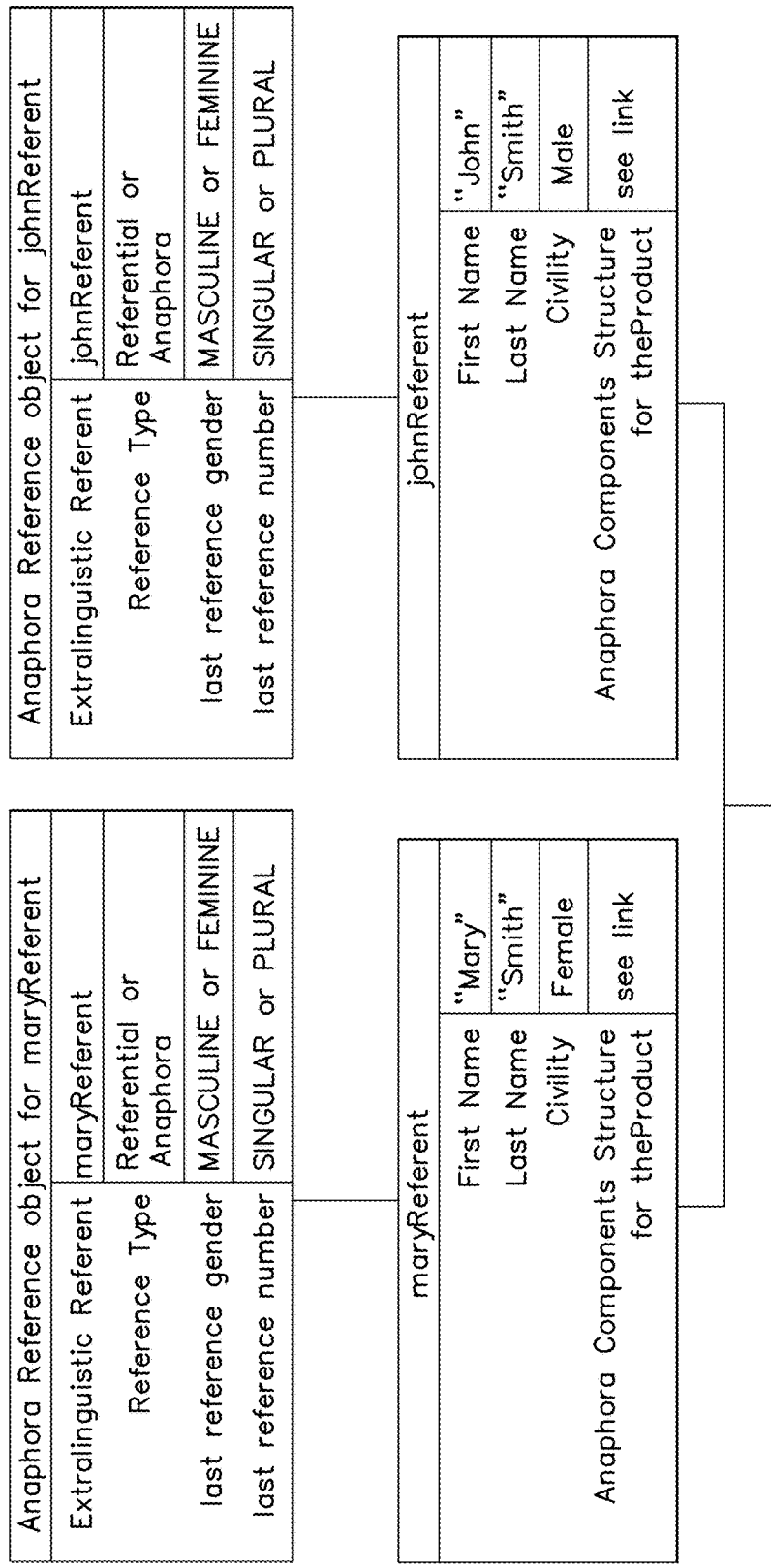

This section improves the algorithms so that you can provide multiple referent items at the same time. As illustrated in FIGS. 14A-B, this relies on an extension of the person's Anaphora Components Structure that will have two different parts:
- one part to describe what to write when in a presence of a single person
- another part to describe what to write when in a presence of multiple persons (ie: a collection)

TABLE 15

| Code | Algorithm Details | Generated text |
|---|---|---|
| insert(johnReferent) | Asks the Anaphora Reference object if there is a pre-existing reference linked to johnReferent.<br>    the answer is no<br>    consider inserting a referential expression<br>    choose one available referential expression: civility + last name<br>    insert the referential expression: "Mr. Smith"<br>    insert a reference in the Anaphora Reference object:<br>        referent : johnReferent<br>        lastExpressionType: referential<br>        lastGender: MASCULINE<br>        lastNumber: SINGULAR<br>capitalize it as it's a start of sentence. | Mr. Smith |
| wears a blue had. | static text | a blue hat. |
| insert(maryReferent) | Asks the Anaphora Reference object if there is a pre-existing reference linked to maryReferent.<br>    the answer is no<br>    consider inserting a referential expression<br>    choose one available referential expression: civility + last name<br>    Insert a referential expression: "Mrs. Smith"<br>    insert a reference in the Anaphora Reference object:<br>        referent : maryReferent<br>        lastExpressionType: referential<br>        lastGender: FEMININE<br>        lastNumber: SINGULAR | Mrs Smith |
| wears a red dress. | static text | a red dress. |
| insert([johnReferent, maryReferent]) | Asks the Anaphora Reference object if there is a pre-existing reference linked to johnReferent and maryReferent.<br>    the answer is yes for both of them<br>    consider inserting an anaphoric expression for the two referents.<br>    choose one available referential expression for the collection: personal pronoun.<br>    Insert an anaphoric expression: "they" (The collection contains two elements) | They |

TABLE 15-continued

| Code | Algorithm Details | Generated text |
|---|---|---|
| | capitalize it as it's a start of sentence.<br>insert a reference in the Anaphora Reference object:<br>  referent : maryReferent<br>  lastExpressionType: anaphora<br>  lastGender: FEMININE<br>  lastNumber: SINGULAR<br>insert a reference in the Anaphora Reference object:<br>  referent : johnReferent<br>  lastExpressionType: anaphora<br>  lastGender: MASCULINE<br>  lastNumber: SINGULAR | |
| are both well-dressed. | static text | are both well-dressed. |

The above algorithm lets the system generate also the following sentence

Mr. and Mrs. Smith are loyal customer. He is 40 years old. she is 43.

This sentence corresponds to the following text template instructions:

insert([johnReferent, maryReferent]) are loyal customers. insert([johnReferent]) is 40 years old. insert([maryReferent]) is 43.

Please note that the ambiguity management algorithms function also with collections. Before making the decision to insert an anaphoric expression, the system detects if there is an ambiguous situation by applying the previous algorithms. If there is an ambiguous situation, a referential expression is preferred to an anaphoric expression. Example:

Mrs. Smith is 40 years old. Mr. Smith is 43. The children are at the university. Mr. and Mrs. Smith are loyal customer.

The insertion of 'the children' creates an ambiguous situation the next time we would like to write Mr. and Mrs. Smith. Therefore, in the sentence "Mr and Mrs Smith are loyal customer", the system inserts a referential expression instead of an anaphoric expression.

If, within the scope of visibility, there is only one reference to one of the two referents to write (Mr. Smith or Mrs. Smith), one anaphora and one referential will both be generated and assembled. Example:

Mr. Smith wears a blue hat. He and Mrs Smith are both well-dressed

In order to find the right personal pronoun, the following rules are applied:
- if one of the collection items is masculine, the collection's gender is masculine
- if all the collection items are feminine, the collection's gender is feminine
- if there is strictly more than one item in the collection, the collection's number is plural
- if there is only one item, the collection's number is singular 7. Possessives Sometimes, we want to talk about an item that is owned by another referent. For example, if Mr. Smith owns a boat, we will refer to this boat with one of the following, depending on the context: Mr. Smith's boat; his boat; it. For example, let's consider the following sentence:

Mr. Smith bought a new boat. His boat is very beautiful. Additionally, it is very fast.

This sentence is generated through the following text template:

insert(johnSmith) bought a new boat. insertPossessive (johnSmith, boat) is very beautiful. Additionally, insertPossessive(johnSmith, boat) is very fast.

When first talking of Mr. Smith's boat, we don't want to say "Mr. Smith's boat", as we already introduced Mr. Smith. Thus, "His boat" is preferred. When trying to generate the Smith's boat, like for the ambiguity detection, the system relies on a forecasting principle. It forecasts the reference type (anaphora or referential, and what kind of anaphora/referential is going to be written) for either the owner and the owned item. The algorithm the system runs is as follows:

Using the forecasting system on the owned object, if the owned object is going to be an anaphora, then write the owned anaphora expression
if not:
  if the owner is going to be an anaphora and this anaphora is a personal pronoun
    Write a possessive determiner according to the owner and owned characteristics
    Insert a reference to the owner in the Anaphora Reference object (but without writing text)
    Write the owned element (which will be a referential)
  otherwise
    Write the basic possessive form using the owner expression and the owned expression. In English, it will use the 's structure like in 'john's boat'

To write the previous example, we rely on the implementation shown in FIG. 15.

TABLE 16

| Code | Algorithm Details | Generated text |
|---|---|---|
| insert(johnSmith) | Asks the Anaphora Reference object if there is a pre-existing reference linked to johnSmith.<br>  the answer is no<br>    consider inserting a referential expression<br>    choose one available referential expression: civility + last name | Mr. Smith |

TABLE 16-continued

| Code | Algorithm Details | Generated text |
|---|---|---|
| | insert the referential expression : "Mr. Smith"<br>insert a reference in the Anaphora Reference object:<br>   referent : johnSmith<br>   lastExpressionType: referential<br>   lastGender: MASCULINE<br>   lastNumber: SINGULAR<br>capitalize it as it's a start of sentence. | |
| bought a new boat. | static text | bought a new boat. |
| insertPossessive(johnSmith, boat) | Asks the Anaphora Reference objects if there is a pre-existing reference linked to boat.<br>   the answer is no<br>   consider inserting a referential expression for boat<br>   choose one available referential expression: 'boat'<br>Ask the Anaphora Reference objects if there is a pre-existing reference linked to johnSmith.<br>   the answer is yes<br>   consider inserting an anaphora expression for johnSmith<br>   choose one available anaphora expression: personal pronoun<br>Since the owner's anaphora expression is a personal pronoun:<br>   insert a reference in the Anaphora Reference object:<br>      referent : johnSmith<br>      lastExpressionType: referential<br>      lastGender: MASCULINE<br>      lastNumber: SINGULAR<br>Write the possessive determiner related to john Smith: 'his'<br>insert a reference in the Anaphora Reference object:<br>   referent : boat<br>   lastExpressionType: referential<br>   lastGender: INANIMATE<br>   lastNumber: SINGULAR<br>Write the referential expression for boat: 'boat'<br>capitalize it as it's a start of sentence. | His boat |
| is very beautiful.<br>Additionally, | static text | is very beautiful.<br>Additionally, |
| insertPossessive(johnSmith, boat) | Asks the Anaphora Reference objects if there is a pre-existing reference linked to boat.<br>   the answer is yes<br>   consider inserting an anaphora expression for boat<br>   choose one available referential expression: personal pronoun<br>Write the anaphora expression for boat: it | it |
| is very fast. | static text | is very fast. |

8. Anaphora Insertion Global and Local Tuning

This section explains how the system allows a tuning of the anaphora generation mechanism. There are two tuning modes a global tuning mode and a local tuning mode.

The global tuning mode allows for declaring heuristics:
These heuristics may apply either to the entire application. For example, in some instances the scope of visibility may be limited to the immediate previous paragraph break. This rule can be customized and be based on another figure: number of words, number of inserted reference for the same object, etc.
Or these heuristics may apply to a specific nature. For example for a specific nature (a person, a product, . . . ) if a reference has already been inserted in the neighborhood using a personal pronoun, we can force to choose once again a personal pronoun for another same-nature reference (see example below).

Please note that for the first category, global heuristics may hard-coded in the system for the system general functioning. That being said, these heuristics can be overridden.

The local tuning mode allows for defining specific local constraints when the entities are inserted. You may insert the referent using a code snippet like: insert(johnSmith, mode). Here, mode is a set of parameters that will be taken into account by the Anaphora Component Structure in order to force use of specific behaviors. For example, you can force the system to use a referential expression even if the system otherwise would have used an anaphoric expression.

This is possible because the system allows a programmatic access to the Anaphora Component Structure. This lets you to know what have already been written and to act accordingly. For example, you can check the following:
Count how many references of the same entity have been inserted since the beginning of the text
Count how many characters is the current paragraph
Know what was the reference type (anaphora or referential) of the last same-nature inserted reference
etc. . . .

This programmatic access allows you to build all the heuristic you need and allows you to cover the vast majority of the cases that are encountered in real life.

Let's see in more details an example that uses the global tuning feature. Consider the following sentence:
Once upon a time, an old man and an old woman owned two cows. The man took them to pasture every day, while the woman turned their milk into butter.

In the second sentence, we would like to keep a parallel structure between the two persons involved. The other possibilities could be:

Once upon a time, an old man and an old woman owned two cows. he took them to pasture every day, while she turned their milk into butter.
but the two next sentences doesn't fit very well.

the next sentence are written using this template text:

insert(oldManReferent) took them to pasture every day, while insert(oldWomanReferent) turned their milk into butter.

TABLE 17

| Code | Algorithm Details | Generated text |
|---|---|---|
| insert(oldManReferent) | Asks the Anaphora Reference object if there is a pre-existing reference linked to oldManReferent.<br>  the answer is yes<br>  consider inserting a anaphora expression<br>  choose one available anaphora expression<br>  insert the referential expression : "he"<br>  insert a reference in the Anaphora Reference object:<br>    referent : oldManReferent<br>    lastExpressionType: referential<br>    lastGender: MASCULINE<br>    lastNumber: SINGULAR<br>    add in the local information: PersonalPronoun<br>  capitalize it as it's a start of sentence. | He |
| took them to pasture every day, while | static text | took them to pasture every day, while |
| insert(oldWomanReferent) | Asks the Anaphora Reference object if there is a pre-existing reference linked to oldWomanReferent.<br>  the answer is yes<br>  consider inserting an anaphora expression<br>  choose one available referential expression: Try "the woman"<br>  check if the local information of a possible other person object.<br>    There is one and the local information is PersonalPronoun.<br>    So "this woman" is forbidden<br>  choose another available referential expression: personal Pronoun<br>  Insert a referential expression: "she"<br>  insert a reference in the Anaphora Reference object:<br>    referent : oldWomanReferent<br>    lastExpressionType: referential<br>    lastGender: FEMININE<br>    lastNumber: SINGULAR<br>    add in the local information: PersonalPronoun | she |
| turned their milk into butter. | static text | turned their milk into butter. |

Once upon a time, an old man and an old woman owned two cows. he took them to pasture every day, while the woman turned their milk into butter.
Once upon a time, an old man and an old woman owned two cows. The man took them to pasture every day, while she turned their milk into butter.

The system will work the following way: Let's suppose the first sentence is written and we start writing the second one. The second sentence will insert two anaphora expressions (one referred to 'the old man', the other referred to 'the old woman').

During the first anaphora insertion (that refers to the old man), the system will set a mark in the Anaphora Reference object that will indicates what kind of anaphora expression has been chosen (either 'he' or 'the old man')

Then during the second anaphora insertion (that refers to the old woman), the system will read the potential marks that could have been set during a previous anaphora insertion on another person referent. If it finds such a mark, then it will take it into account to choose the correct parallel structure. This is illustrated in FIGS. 16A-B.

Here is the algorithm that is used to control the way anaphora expressions are chosen:
The beginning of the sentence is written:
Once upon a time, an old man and an old woman owned two cows.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method for use in connection with automatic text generation, the method comprising:
   using at least one processor to perform:
      obtaining a template to include human language text and at least a first tag that serves as a first placeholder for a first text portion referring to a first referent, and a second tag that serves as a second placeholder for a second text portion referring to the first referent;
      obtaining, from a user, multiple language options to be used in place of the first tag and the second tag when generating output text using the obtained template, the multiple language options comprising at least a first referential expression for the first referent and a plurality of anaphoric expressions for the first referent including a first anaphoric expression for the first referent and a second anaphoric expression for the first referent;

obtaining, from the user, a second referential expression for referring to a second referent, wherein the first referent and the second referent are of a same type;

storing, in a first data structure including a first set of fields associated to the first referent, information about the first referent and a first link to a second data structure;

storing, in the second data structure including a second set of fields associated to the first referent and the second referent, the multiple language options to use when referring to the first referent and the second referent, including the first referential expression, the second referential expression and the plurality of anaphoric expressions;

storing, in a third data structure including a third set of fields associated to the second referent, information about the second referent and a second link to the second data structure;

providing the obtained template, at least a portion of the information about the first referent stored in the first data structure, at least a portion of the information about the second referent stored in the third data structure and the multiple language options stored in the second data structure to a natural language generation system for use in generating the output text by using the obtained template, the natural language generation system programmed to identify which of the multiple language options to use for referring to the first referent and which of the multiple language options to use for referring to the second referent in the output text by accessing one or more fields of the second set of fields in the second data structure;

determining to use the first referential expression in place of the first tag;

selecting one of the first and second anaphoric expressions to use in place of the second tag by using the accessed one or more fields of the second set of fields;

generating, using the natural language generation system and based on the template, the output text to include the first referential expression in place of the first tag and the selected one anaphoric expression in place of the second tag; and presenting, via a device, the output text to the user.

2. The method of claim 1, further comprising:
obtaining, from the user, information specifying the first referent, the information including a gender of the first referent.

3. The method of claim 1, wherein the first referent comprises a plurality of referents each having a gender among a plurality of genders, and wherein the obtaining comprises: obtaining, from the user, information specifying different anaphoric expressions for different genders in the plurality of genders.

4. The method of claim 1, wherein the obtaining comprises:
obtaining, from the user, information specifying a plural anaphoric expression for referring simultaneously to both the first referent and the second referent.

5. The method of claim 1, wherein the obtaining comprises:
obtaining, from the user, information specifying at least one non-possessive expression for the first referent;

obtaining, from the user, information specifying a first possessive expression for the first referent and a second possessive expression for the first referent, each of the possessive expressions indicating possession of the first referent by the second referent, wherein the first possessive expression includes an anaphoric expression for the second referent, wherein the second possessive expression includes a referential expression for the second referent.

6. The method of claim 1, wherein the second tag precedes the first tag in the template.

7. The method of claim 1, further comprising:
obtaining, from the user, a third referential expression for referring to a third referent, wherein the first referent and the third referent are of the same type; and storing, in a fourth data structure including a fourth set of fields associated to the third referent, information about the third referent and a third link to the second data structure.

8. The method of claim 1, wherein selecting one of the first and second anaphoric expressions to use in place of the second tag comprises selecting one of the first and second anaphoric expressions based on the first referential expression and text preceding the first tag in the template.

9. The method of claim 1, wherein the first referential expression comprises one or more words and each of the plurality of anaphoric expressions comprises one or more words.

10. A system for use in connection with automatic text generation, the system comprising:
at least one processor configured to perform:
obtaining a template to include human language text and at least a first tag that serves as a first placeholder for a first text portion referring to a first referent, and a second tag that serves as a second placeholder for a second text portion referring to the first referent;

obtaining, from a user, multiple language options to be used in place of the first tag and the second tag when generating output text using the obtained template, the multiple language options comprising at least a first referential expression for the first referent and a plurality of anaphoric expressions for the first referent including a first anaphoric expression for the first referent and a second anaphoric expression for the first referent;

obtaining, from the user, a second referential expression for referring to a second referent, wherein the first referent and the second referent are of a same type;

storing, in a first data structure including a first set of fields associated to the first referent, information about the first referent and a first link to a second data structure;

storing, in the second data structure including a second set of fields associated to the first referent and the second referent, the multiple language options to use when referring to the first referent and the second referent, including the first referential expression, the second referential expression and the plurality of anaphoric expressions;

storing, in a third data structure including a third set of fields associated to the second referent, information about the second referent and a second link to the second data structure;

providing the obtained template, at least a portion of the information about the first referent stored in the first data structure, at least a portion of the information about the second referent stored in the third data structure and the multiple language options stored in the second data structure to a natural language generation system for use in generating the output text by using the obtained template, the natural language generation system programmed to identify which of the multiple language options to use for referring to the first referent and which of the multiple language options to use for referring to the second referent in the output text by accessing one or more fields of the second set of fields in the second data structure;

determining to use the first referential expression in place of the first tag;

selecting one of the first and second anaphoric expressions to use in place of the second tag by using the accessed one or more fields of the second set of fields;

generating, using the natural language generation system and based on the template, the output text to include the first referential expression in place of the first tag and the selected one anaphoric expression in place of the second tag; and presenting, via a device, the output text to the user.

11. The system of claim 10, wherein the first referent comprises a plurality of referents each having a gender among a plurality of genders, and wherein the obtaining comprises: obtaining, from the user, information specifying different anaphoric expressions for different genders in the plurality of genders.

12. The system of claim 10, wherein the obtaining comprises:
obtaining, from the user, information specifying a plural anaphoric expression for referring simultaneously to both the first referent and the second referent.

13. The system of claim 10, wherein the second tag precedes the first tag in the template.

14. The system of claim 10, wherein the at least one processor is further configured to perform:
obtaining, from the user, a third referential expression for referring to a third referent, wherein the first referent and the third referent are of the same type; and
storing, in a fourth data structure including a fourth set of fields associated to the third referent, information about the third referent and a third link to the second data structure.

15. The system of claim 10, wherein selecting one of the first and second anaphoric
expressions to use in place of the second tag comprises selecting one of the first and second anaphoric expressions based on the first referential expression and text preceding the first tag in the template.

16. The system of claim 10, wherein the first referential expression comprises one or more words and each of the plurality of anaphoric expressions comprises one or more words.

17. At least one non-transitory computer-readable storage medium storing processor-executable instructions that, when executed by at least one processor, cause the at least one processor to perform a method for use in connection with automatic speech generation, the method comprising:
obtaining a template to include human language text and at least a first tag that serves as a first placeholder for a first text portion referring to a first referent, and a second tag that serves as a second placeholder for a second text portion referring to a the first referent;
obtaining, from a user, multiple language options to be used in place of the first tag and the second tag when generating output text using the obtained template, the multiple language options comprising at least a first referential expression for the first referent and a plurality of anaphoric expressions for the first referent including a first anaphoric expression for the first referent and a second anaphoric expression for the first referent;
obtaining, from the user, a second referential expression for referring to a second referent, wherein the first referent and the second referent are of a same type;
storing, in a first data structure including a first set of fields associated to the first referent, information about the first referent and a first link to a second data structure;
storing, in the second data structure including a second set of fields associated to the first referent and the second referent, the multiple language options to use when referring to the first referent and the second referent, including the first referential expression, the second referential expression and the plurality of anaphoric expressions;
storing, in a third data structure including a third set of fields associated to the second referent, information about the second referent and a second link to the second data structure;
providing the obtained template, at least a portion of the information about the first referent stored in the first data structure, at least a portion of the information about the second referent stored in the third data structure and the multiple language options stored in the second data structure to a natural language generation system for use in generating the output text by using the obtained template, the natural language generation system programmed to identify which of the multiple language options to use for referring to the first referent and which of the multiple language options to use for referring to the second referent in the output text by accessing a field of the second set of fields in the second data structure;
determining to use the first referential expression in place of the first tag;
selecting one of the first and second anaphoric expressions to use in place of the second tag by using the accessed one or more fields of the second set of fields;
generating, using the natural language generation system and based on the template, the output text to include the first referential expression in place of the first tag and the selected one anaphoric expression in place of the second tag; and
presenting, via a device, the output text to the user.

18. The at least one non-transitory computer-readable storage medium of claim 17, wherein the second tag precedes the first tag in the template.

19. The at least one non-transitory computer-readable storage medium of claim 17, where the method further comprises:
obtaining, from the user, a third referential expression for referring to a third referent, wherein the first referent and the third referent are of the same type; and
storing, in a fourth data structure including a fourth set of fields associated to the third referent, information about the third referent and a third link to the second data structure.

20. The at least one non-transitory computer-readable storage medium of claim 17, wherein selecting one of the first and second anaphoric expressions to use in place of the second tag comprises selecting one of the first and second anaphoric expressions based on the first referential expression and text preceding the first tag in the template.

* * * * *

UNITED STATES PATENT AND TRADEMARK OFFICE
CERTIFICATE OF CORRECTION

PATENT NO. : 10,275,442 B2
APPLICATION NO. : 16/011832
DATED : April 30, 2019
INVENTOR(S) : Alain Kaeser et al.

It is certified that error appears in the above-identified patent and that said Letters Patent is hereby corrected as shown below:

On the Title Page

In items (71) Applicant and (73) Assignee:
Please replace "Lyons" with --Lyon--.

Signed and Sealed this
Eighteenth Day of June, 2019

Andrei Iancu
*Director of the United States Patent and Trademark Office*